United States Patent
Trehan

(10) Patent No.: US 12,431,121 B2
(45) Date of Patent: Sep. 30, 2025

(54) LANGUAGE BASED ADAPTIVE FEEDBACK GENERATION SYSTEM AND METHOD THEREOF

(71) Applicant: Rajiv Trehan, Bangkok (TH)

(72) Inventor: Rajiv Trehan, Bangkok (TH)

(73) Assignee: Rajiv Trehan, Bangkok (TH)

( * ) Notice: Subject to any disclaimer, the term of this patent is extended or adjusted under 35 U.S.C. 154(b) by 529 days.

(21) Appl. No.: 17/831,502

(22) Filed: Jun. 3, 2022

(65) Prior Publication Data

US 2023/0395062 A1 Dec. 7, 2023

(51) Int. Cl.
*G10L 13/027* (2013.01)
*G10L 15/00* (2013.01)
*G10L 15/22* (2006.01)

(52) U.S. Cl.
CPC ............ *G10L 15/005* (2013.01); *G10L 15/22* (2013.01); *G10L 2015/223* (2013.01); *G10L 2015/228* (2013.01)

(58) Field of Classification Search
CPC . G10L 15/005; G10L 15/22; G10L 2015/223; G10L 2015/228; G06F 9/454
See application file for complete search history.

(56) References Cited

U.S. PATENT DOCUMENTS

| | | | | |
|---|---|---|---|---|
| 2020/0041803 | A1* | 2/2020 | Reyes | G06V 40/10 |
| 2020/0082815 | A1* | 3/2020 | Haze | G10L 15/19 |
| 2022/0383260 | A1* | 12/2022 | Palamadai | H04L 67/306 |
| 2023/0104880 | A1* | 4/2023 | Pearson | G06F 3/04842 715/835 |
| 2024/0176414 | A1* | 5/2024 | Mclachlan | H04M 1/72454 |

* cited by examiner

*Primary Examiner* — Pierre Louis Desir
*Assistant Examiner* — Cody Douglas Hutcheson
(74) *Attorney, Agent, or Firm* — Kendal M. Sheets

(57) ABSTRACT

The invention relates to system and method for providing language based adaptive feedback to users. The method includes receiving information related to a target language associated with a user; identifying occurrence of at least one event requiring rendering of automated feedback to the user; determining ambient factors at and proximate to the time of occurrence of each of the at least one event, and user attributes; determining a criticality factor associated with each of the at least one event; determining, for each of the at least one event, a feedback rendering time window; identifying, for each of the at least one event, feedback attributes of the associated feedback; assigning a priority to each of the at least one event; identifying one or more events from each of the at least one event based on the assigned priority; and rendering the feedback associated with each of the one or more events.

15 Claims, 17 Drawing Sheets

LANGUAGE BASED ADAPTIVE FEEDBACK GENERATION SYSTEM AND METHOD THEREOF

TECHNICAL FIELD

This disclosure relates generally to Artificial Intelligence (AI) based conversational systems, and more particularly to language based adaptive feedback generation system and method.

BACKGROUND

As the world around us is increasingly becoming digital and handsfree, conversation Artificial Intelligence (AI) based conversational engines are being used to enable interaction between humans and computers or other smart devices. Conversational AI may be defined as collection of technologies that improve and enhance automated messaging and speech-enabled applications by allowing smart devices and humans to interact in a human-like manner. With conversational AI, smart devices can recognize voice and text inputs, understand intent and respond in a way that mimics human conversation to enable an experience of human-like interaction. This human-like interactions have further enabled and encouraged humans to seamlessly get opinions, recommendations, assistance, or to get transactions or other objectives executed through conversation.

In order to provide response in multiple languages, conversational AI engines are configured to generate AI feedback in different languages. Different languages take different amount of time to convey similar information (i.e., the AI feedback) in a real-time mufti-model feedback environment. For example, an information to be conveyed in English language may take lesser time than the same information conveyed in Japanese language. In most of the application areas where AI conversational engines are used, timely and accurate delivery of the AI feedback is considered to be of a critical and/or essential factor for usability and adaptability of such products/services based on good user experience. However, none of the conventional AI conversational engines are capable of delivering the AI feedback in a timely manner based on language associated with the end-user. Moreover, such AI feedback is not adapted based on other ambient factors that may have an impact on urgency or criticality of delivering the AI feedback. All such deficiencies in the conventional AI conversational engines, lead to bad user experience and further impact widespread adaptability of such products/services.

Therefore, there is a need for an efficient and reliable AI conversational engine that timely provides language based adaptive feedback to users.

SUMMARY

In an embodiment, a method for providing language based adaptive feedback to users is disclosed. The method may include receiving information related to a target language associated with a user. The target language is determined based on at least one of a user-profile, a location of the user, interactions with the user, or an input language provided by the user. The method may further include identifying occurrence of at least one event requiring rendering of automated feedback to the user. Each of the at least one event may be associated with a feedback. The method may include determining ambient factors at and proximate to the time of occurrence of each of the at least one event, and user attributes. The method may further include determining a criticality factor associated with each of the at least one event based on the ambient factors and the user attributes. The method may include determining for each of the at least one event, a feedback rendering time window in response to identifying occurrence of each of the at least one event, based on the associated criticality factor and the user attributes. The method may further include identifying, for each of the at least one event, feedback attributes of the associated feedback, based on the determined feedback rendering time window, the user attributes, and the target language. The method may include assigning a priority to each of the at least one event based on the associated feedback rendering time window and the feedback attributes. The method may further include identifying one or more events from each of the at least one event based on the assigned priority. The priority determined for each of the one or more events may be greater than a threshold. The method may include rendering the feedback associated with each of the one or more events to the user, contemporaneous to identifying occurrence of the one or more events.

In another embodiment, a system for providing language based adaptive feedback to users is disclosed. The system may include a processor, and a memory communicatively coupled to the processor. The memory includes processor instructions, which when executed by the processor causes the processor to receiving information related to a target language associated with a user. The target language is determined based on at least one of a user-profile, a location of the user, interactions with the user, or an input language provided by the user. The processor instructions may identify occurrence of at least one event requiring rendering of automated feedback to the user. Each of the at least one event may be associated with a feedback. The processor instructions may determine ambient factors at and proximate to the time of occurrence of each of the at least one event, and user attributes. The processor instructions may determine a criticality factor associated with each of the at least one event based on the ambient factors and the user attributes. The processor instructions may determine, for each of the at least one event, a feedback rendering time window in response to identifying occurrence of each of the at least one event, based on the associated criticality factor and the user attributes. The processor instructions may identify, for each of the at least one event, feedback attributes of the associated feedback, based on the determined feedback rendering time window, the user attributes, and the target language. The processor instructions may assign a priority to each of the at least one event based on the associated feedback rendering time window and the feedback attributes. The processor instructions may identify one or more events from each of the at least one event based on the assigned priority. The priority determined for each of the one or more events may be greater than a threshold. The processor instructions may render the feedback associated with each of the one or more events to the user, contemporaneous to identifying occurrence of the one or more events.

In yet another embodiment, a non-transitory computer-readable medium storing computer-executable instruction for providing language based adaptive feedback to users is disclosed. The stored instructions, when executed by a processor, may cause the processor to perform operations including receiving information related to a target language associated with a user. The target language is determined based on at least one of a user-profile, a location of the user, interactions with the user, or an input language provided by the user. The operations may further include identifying occurrence of at least one event requiring rendering of automated feedback to the user. Each of the at least one event may be associated with a feedback. The operations may further include determining ambient factors at and proximate to the time of occurrence of each of the at least one event, and user attributes. The operations may further include determining a criticality factor associated with each of the at least one event based on the ambient factors and the user attributes. The operations may further include determining, for each of the at least one event, a feedback rendering time window in response to identifying occurrence of each of the at least one event, based on the associated criticality factor and the user attributes. The operations may further include identifying, for each of the at least one event, feedback attributes of the associated feedback, based on the determined feedback rendering time window, the user attributes, and the target language. The operations may further include assigning a priority to each of the at least one event based on the associated feedback rendering time window and the feedback attributes. The operations may further include identifying one or more events from each of the at least one event based on the assigned priority. The priority determined for each of the one or more events may be greater than a threshold. The operations may further include rendering the feedback associated with each of the one or more events to the user, contemporaneous to identifying occurrence of the one or more events.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
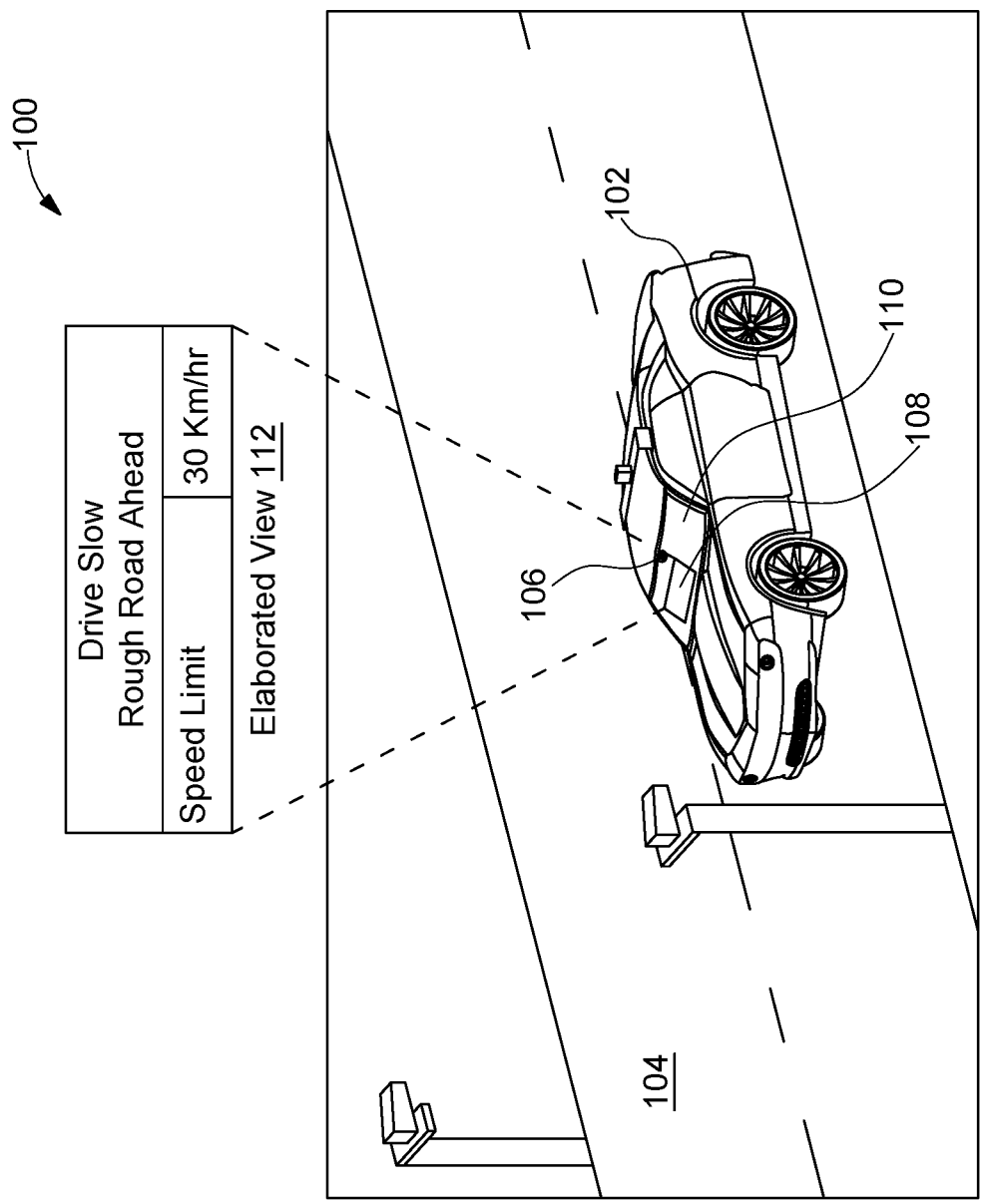
FIG. 1 illustrates an exemplary scenario for providing language based adaptive feedback to a user of an autonomous vehicle, in accordance with some embodiments.

Referring now to FIG. 1, an exemplary scenario 100 for providing language based adaptive feedback to a user of an autonomous vehicle 102 is illustrated, in accordance with some embodiments. The autonomous vehicle 102 may include semi-autonomous and fully autonomous vehicles. The autonomous vehicle 102 may implement or may be configured with a system that uses an adaptive feedback engine. The adaptive feedback engine may be an Artificial Intelligence (AI) assisted conversational engine. Further, the adaptive feedback engine of the autonomous vehicle 102 may be configured or adapted based on a user-profile associated with the user within the autonomous vehicle 102, a location of the user, interactions with the user, and an input language provided by the user. Based on the above details, information related to a target language associated with the user may be received. In some embodiments, the target language may be used to configure the adaptive feedback engine. It will be apparent to a person skilled in the art that the adaptive feedback engine may not be configured merely based on the target language. It will be further appreciated that the adaptive feedback engine may be configured in multiple languages. The adaptive feedback engine and various components within the adaptive feedback engine have been explained in detail in conjunction with FIG. 3. Once the adaptive feedback engine is configured, it may provide contemporaneous feedbacks to the user in response to one or more events that may occur inside or outside (in proximity) the autonomous vehicle 102.

As represented by the exemplary scenario above, the autonomous vehicle 102 may be moving on a highway 104. In some implementations, when the autonomous vehicle 102 is powered on, the adaptive feedback engine configured within the autonomous vehicle 102 may receive information related to a target language associated with the user sitting within the autonomous vehicle 102. In an embodiment, the target language (i.e., language spoken and/or understood by the user) may be determined based on at least one of the user-profile, the location of the user, interactions with the user, or the input language provided by the user. It will be apparent to a person skilled in the art that the determination of the target language may be independent and separated from the autonomous vehicle 102. Contemporaneous to the autonomous vehicle 102 being powered on, the adaptive feedback engine may start identifying occurrence of at least one event in and/or around the autonomous vehicle 102. One or more of the at least one event may require rendering of automated feedback to the user. In an embodiment, each of the at least one event may have an associated feedback. In current exemplary scenario 100, examples of the at least one event may include, but are not limited to, over speeding, rough road conditions, low fuel, wrong lane, zebra crossing ahead, diversion ahead, and some obstacles present on the path of the autonomous vehicle 102.

By way of an example in the current scenario 100, to the following events may be generated at different times: 'rough road ahead', 'low fuel', 'over speeding', and 'wrong lane'. Upon identifying each of these events, the adaptive feedback engine may determine ambient factors at and proximate to the time of occurrence of each of these events, and user attributes. Examples of the ambient factors may include, but are not limited to, road conditions, traffic conditions, weather conditions, health indicators of the autonomous vehicle 102, vibrations and noise within the autonomous vehicle 102, temperature within the autonomous vehicle 102. Further, the user attributes may correspond to age, height, weight, sex, current activity being performed by the user, user response history to such events, and current body posture. In an embodiment, the ambient factors and the user attributes may be determined using a camera 106 and additional sensors (not show in the FIG. 1). Examples of the camera 106 may include, but are not limited to, a smart camera, a stereo camera, a time-of-flight (ToF) camera, a eagle-eyed vision camera, a low light camera, an infrared camera, and a light detection and ranging (lidar) camera. The additional sensors may either be configured with (inside and/or outside) the autonomous vehicle 102 or may be worn by the user. In any case, each of the additional sensors may be communicatively coupled to the adaptive feedback engine. Thus, the adaptive feedback engine may continuously receive sensor inputs from the additional sensors.

Based on the ambient factors and the user attributes, the adaptive feedback engine may determine a criticality factor associated with each of these events. The criticality factor is determined iteratively for each event and may thus keep on varying. In other words, the criticality factor of a given event may be dissimilar at different times. The determined criticality factor for an event may correspond or relate to seriousness, importance, or severity of that event at the given time instant. Upon determining the criticality factor, the adaptive feedback engine may determine a feedback rendering time window for each of these events. The feedback rendering time window may be determined based on the associated criticality factor and the user attributes. The feedback rendering time window for a given event may correspond to the time frame within which the feedback in response to occurrence of the event may be rendered or presented to the user. In an embodiment, the feedback rendering time window for an event may be determined in response to and contemporaneous to identifying occurrence of that event. Once the feedback rendering time window is determined for the given event, the adaptive feedback engine may identify feedback attributes of the associated feedback for that event. The feedback attributes may be determined based on the determined feedback rendering time window, the user attributes, and the target language. Examples of the feedback attributes may include, but is not limited to, category of feedback (for example, warning, error, generic information, trivia, caution, or danger), mode of delivering the feedback (for example, audio, video, or text), required clarity, time required to render the feedback, type of activity/event for which the feedback is generated, or number of users receiving the feedback.

Upon determining the feedback attributes associated with the feedback, the adaptive feedback engine may assign a priority to each of the events identified at a time instant. For a given event, the adaptive feedback engine may assign priority to that event based on the associated feedback rendering time window and the feedback attributes. In other words, in order to assign priority to a given event, the adaptive feedback engine may evaluate both the feedback rendering time window and the feedback attributes. Thus, it may be noted that the priority assigned to an event may not be constant and may change based on variance in the feedback rendering time window and/or the feedback attributes. It may further be noted that since the feedback rendering time window depends on ambient conditions (amongst other things), this time window keeps changing as the ambient conditions change. To summarize, priority associated with an event keeps on changing and an event that may have a very high priority at a given time instant, may have a low priority at a subsequent time instant. Further, while determining priority of a given event, the adaptive feedback engine also determines that relevant context in which the event occurs. The context may be determined based on the ambient conditions and the user attributes. Accordingly, in one configuration, a given event may be assigned the highest priority in a first context, while the same event may be assigned the lowest priority in another context. For example, the event of driving above a certain speed may be assigned very high priority if the current speed is above the permissible limit in a particular location, while driving at the same speed may be assigned lowest (or no) priority, if the current speed is below the permissible limit defined in a different location. An AI module within the adaptive feedback engine may be configured and/or trained to determine and assign priorities to events.

By way of an example in the current scenario 100, the priority assigned to each of the identified events, i.e., 'rough road ahead', 'low fuel', 'over speeding', and 'wrong lane' may correspond to '1', '3', '2', and '4', respectively. A method of assigning the priority has been explained in detail in conjunction with FIG. 9 to FIG. 12.

Once the priority is assigned to each of the events, the adaptive feedback engine may identify one or more events from these events based on the assigned priority, such that, the priority determined for each of the one or more events is greater than a threshold. The threshold value may not be fixed and may be varied by the AI module, based on the identified ambient conditions and the current context. Additionally, or alternatively, apart from the AI model, the threshold may be determined based on one or more of other algorithmic models or statistical models. In some embodiments, one or more of the AI model, the algorithmic models, or the statistical models may be specific to the device on which they have been configured or implemented. By way of an example, suppose in the current scenario 100, the value for the threshold may be set at '3,' as determined by the AI module. Thus, based on the determined threshold value, the following events are identified as having priority above the threshold of 3, i.e., 'rough road ahead' (assigned priority of '1') and 'over speeding' (assigned priority of '2').

Once the one or more events have been identified, then the adaptive feedback engine may render the feedback associated with each of the one or more events to the user. As will be appreciated, the feedback associated with each of the one or more events may be rendered contemporaneous to identification of occurrence of these events. In some configurations, the feedback associated with each of the one or more events may be rendered to the user based on the priority order determined for the respective events. This scenario is relevant when the mode of delivering or rendering the feedback is the same. However, it will be apparent to a person skilled in the art that multiple such feedbacks may be rendered at the same time. This scenario is relevant when the modes of rendering the feedbacks associated with each of the one or more events may have non-overlapping and non-interfering modes. Non-overlapping and non-interfering modes, viz a viz each other, for example, may include audio, video, textual, or haptic feedback.

By way of an example of rendering feedback in interfering and/or overlapping modes, in the current scenario 100, the feedback for both the events, i.e., 'rough road ahead' and 'over speeding' may be configured to be rendered in the audio mode. Upon identifying the interfering mode for these feedbacks, the priority order for these two events may be determined based on the assigned priority. Accordingly, feedback associated with the event 'rough road ahead' may be rendered first, followed by the feedback associated with the event 'over speeding. By way of an example of rendering feedback in non-interfering and/or non-overlapping modes, in the current scenario 100, the feedback associated with the event 'rough road ahead' may be configured to be rendered in the video mode, while the feedback associated with the event 'over speeding' may be configured to be rendered in the audio mode. Thus, in this case, a feedback 108 associated with the event 'rough road ahead' may be displayed on a windshield 110 of the autonomous vehicle 102. The feedback 108 rendered on the windshield 110 is depicted via an elaborated view 112. As depicted via the elaborated view, the feedback 108 rendered on the windshield 110 may include 'drive slow, rough road ahead.' At the same time, since the autonomous vehicle 102 was over speeding, an audio message may also be rendered to the user as "reduce your speed, you are over speeding." The audio feedback may be provided to the user via speakers inbuilt within the autonomous vehicle 102. A method of rendering the feedback associated with the one or more events has been further explained in conjunction with FIG. 5 and FIG. 6.

Referring now to FIGS. 2A-2F exemplary scenarios for providing adaptive feedback to a user 202 via a smart device 200 are illustrated, in accordance with some embodiments. Examples of the smart device 200 may include, but are not limited to a smart TV, an Augmented Reality (AR) device, a Virtual Reality (VR) device, a mobile phone, a laptop, a tablet, or a smart projector with inbuilt camera. The adaptive feedback may be based on a target language associated with the user. As depicted via the exemplary scenarios in the FIGS. 2A-2F, the language based adaptive feedback may be provided to the user 202 during a circuit training workout being performed by the user 202. The adaptive feedback may be provided to the user 202 as a multimedia content via a display of the smart device 200 or by playing an audio via one or more of speakers of the smart device 200, headphones/earphones worn by the user 202, or external speakers placed in proximity to the user 202 and connected to the smart device 200. These external speakers may be directional speakers. In an embodiment, the smart device 200 may be implemented or configured with the adaptive feedback engine. The adaptive feedback engine may correspond to the AI assisted adaptive feedback engine.

Further, the smart device 200 may include a camera 204, a display screen, one or more processors (not shown), a memory (not shown), a microphone (not shown), one or more sensors (not shown), and a speaker (not shown). The camera 204, for example, may be, but is not limited to an off the shelf camera, an infrared camera, a motion detection camera, or similar cameras with combination of one or more features. In addition to the camera 204 (i.e., the inbuilt camera), external cameras 206 may also be provided that may be communicatively coupled to the smart device 200. The external cameras 206 may enable capturing more information about the user 202 and the user environment. The one or more sensors may either be placed within the room where the user 202 is located or may be placed partially or wholly on body of the user 202. Examples of one or more sensors may include, but are not limited to, Light Detection and Ranging (LiDAR), infrared sensor, motion sensor, proximity sensor, temperature sensor, hear-rate sensor, pulse sensor, perspiration sensor, pedometer, oximeter, or humidity sensor.

The display screen of the smart device 200, for example, may include, but is not limited to a Liquid crystal display (LCD), a Light-emitting diode (LED) backlit LCD, a Thin-Film Transistor (TFT) LCD, an LED display, an Organic LED (OLED) display, an Active Matrix Organic LED (AMOLED) display, a Plasma Display Panel (PDP) display, a Quantum Dot LED (QLED) display, or the like.

The smart device 200 may be operated or controlled by the user 202 using voice-based inputs. The voice-based input received from the user 202, via the microphone, may be processed by a Natural Language Processing (NLP) model configured within the adaptive feedback engine implement within the smart device 200. The NLP model may be based on elastic stretching mechanism that has been described in detail in the U.S. application Ser. No. 17/317,047, titled "METHOD AND SYSTEM FOR PROCESSING USER INPUTS USING NATURAL LANGUAGE PROCESSING," which is hereby incorporated by reference in its entirety. In an additional or alternate implementation, other examples of the NLP model may include, but are not limited to Bidirectional Encoder Representations from Transformers (BERT), Robustly Optimized BERT Pretraining Approach (RoBERTa), ALBERT XLNet, and the like. It may be noted that in addition to and in combination with the voice-based inputs, the smart device 200 may also be operated or controlled using one or more of, but not limited to touch gestures, air gestures, eye gestures, biometric inputs, game controllers, inputs via keyboard, mouse or any other input devices.

The NLP model may process the voice-based inputs to extract user selection of one of the circuit training workout. Examples of types of circuit training workout may include, but are not limited to, circuit training workout for beginners, strength circuit training workout, cardio circuit training workout, sport-specific circuit training workout, timed circuit training workout, and running circuit training workout. In an embodiment, the NLP model may be configured using an input language associated with the user 202. In some embodiment, the NLP model may be configured for multiple different language, such that the NLP model is language agnostic and can be used by any user irrespective of his/her language. Additionally, the NLP model may be configured to correctly understand intent of the user 202 based on context in which certain words and phrases (that may sound phonetically similar) are used. In other words, since the NLP model is configured based on context, it is able to clearly differentiate between utterance that may be potentially competing, based on the context in which they are used.

The adaptive feedback engine implemented within the smart device 200 may be configured based on a user-profile associated with the user 202, a location of the user 202, and the input language being used by the user 202. Information related to the input language, or the target language may be received by the adaptive feedback engine. The target language may be determined based on one or more of the user-profile of the user 202, the current location of the user 202, interactions with the user 202, or the input language provided by the user 202.

Figure 2A:
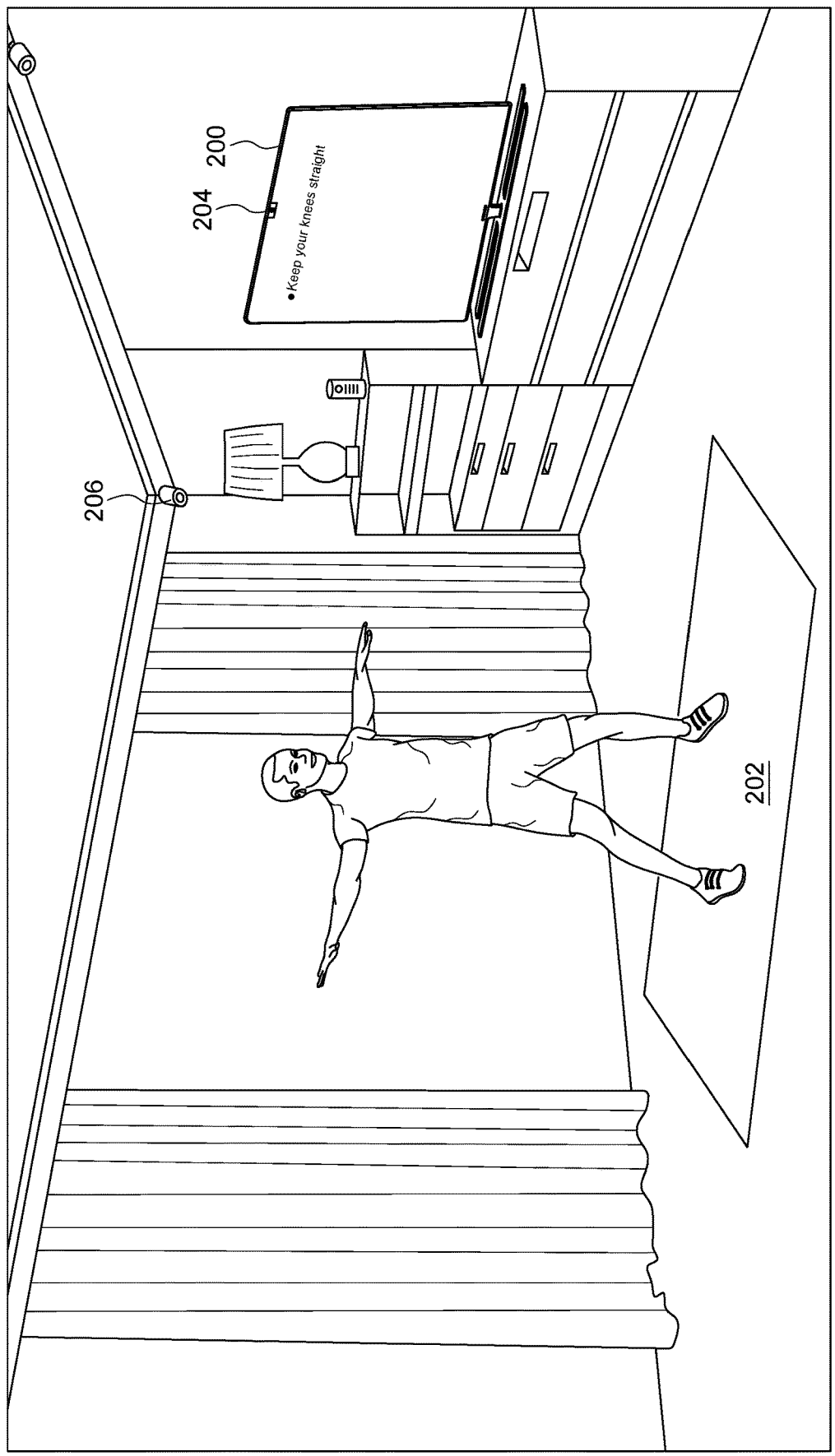
FIG. 2A-2F illustrates an exemplary scenario for providing language based adaptive feedback to a user via a display device, in accordance with some embodiments.

Using the adaptive feedback engine configured within the smart device 200, the user 202 may be provided feedback associated with one or more events identified while the user 202 is performing the circuit training workout. As depicted in FIG. 2A, the user 202 may start the circuit training workout with the jumping jack exercise. On and even before such initiation, the adaptive feedback engine may start identifying occurrence of at least one event that may require rendering of automated feedback to the user 202. In an embodiment, each of the at least one event may be associated with a feedback (i.e., the language based feedback).

In current exemplary scenario, when the user is performing jumping jacks, the identified events may correspond to 'Knees Too Close', 'Bent Knees,' 'Stance Too Wide,' or 'Reps Too Slow'. It may be noted that these events may occur at the same time instant or at different and closely placed time instants. Upon identifying each of these events, the adaptive feedback engine may identify determine ambient factors at and proximate to the time of occurrence of each of these events and user attributes associated with the user 202. Examples of the ambient factors may include, but are not limited to, room temperature, room lightning, floor furnishings, open space in the room to perform a given activity, number of users present in the room, type of surface (slippery or rough), and ambient noise. Further, the user attributes may include, but are not limited to, age, height, weight, sex, activity performance history, previous feedbacks/messages provided to the user, contacts/friends on social networks, clothes, accessories, wearables, and body posture. Based on the determined ambient factors and the user attributes, the adaptive feedback engine may determine a criticality factor associated with each of these events. The determined criticality factor may enable prediction of seriousness, relevance, or importance of each of these events. By way of an example, if the user 202 is obese, old, or has history of knee or join pain, 'Bent Knees' or 'Reps Too Slow' may not be a serious or important event. By way of another example, if the type of surface in the room is slippery, 'Stance Too Wide' may be a serious event, as a wider stance on such surface may lead to the user slipping and eventually hurting himself. By way of yet another example, if the user 202 has a history of performing jumping jacks at a very fast pace, 'Reps Too Slow' may be considered as a highly relevant or important event, since slow reps would be interpreted as dip in performance of the user 202.

The adaptive feedback engine may then determine a feedback rendering time window for each of these events, based on the associated criticality factor and the user attributes. Thereafter, the adaptive feedback engine may identify feedback attributes of the associated feedback for each of these events. The feedback attributes may be determined based on the determined feedback rendering time window, system time required to create the rendering, the user attributes, and the target language. Once the feedback attributes are determined, the adaptive feedback engine may assign a priority to each of these events based on the associated feedback rendering time window and the feedback attributes. As discussed in detail in FIG. 1, the priority assigned to each of these events may also be based on the current context as derived from the ambient conditions, user attributes, or other similar factors.

In continuation of the examples given above, based on the context, the adaptive feedback engine may assign varying priorities to each of the events: 'Knees Too Close.' 'Bent Knees,' 'Stance Too Wide,' or 'Reps Too Slow'. Considering the example, where the user 202 is either old, obese, or suffering from an injury, 'Knees Too Close' may be assigned a priority of 2, 'Bent Knees' may be assigned a priority of 3, 'Stance Too Wide' may be assigned a priority of 1, and 'Reps Too Slow' may be assigned a priority of 4. It may be noted that had the user 202 been fit, the assigned priorities may be as follows: 'Knees Too Close' may be assigned a priority of 1, 'Bent Knees' may be assigned a priority of 1, 'Stance Too Wide' may be assigned a priority of 3, and 'Reps Too Slow' may be assigned a priority of 2. In other words, priority assigned to events may vary based on user attributes and ambient conditions.

Once the priority is assigned to each of these events, one or more events that have a priority greater than a predetermined threshold may be selected at a given time instant. For the one or more events thus selected, the associated feedback may be rendered to the user 202. In an alternate implementation, if the feedback rendering time window is wide enough to accommodate all feedbacks to be presented to the user at that time instant, then such priority comparison with threshold may be skipped. In another alternate or additional implementation, if the feedback for all or most of the events may be rendered via non-overlapping and non-interfering modes, then all such feedbacks may be rendered to the user 202 via respective non-overlapping and non-interfering modes. In either case, the feedback that may be rendered corresponding to each of these events are: 'Widen Your Stance' for the event 'Knees Too Close,' 'Keep Knees Straight' for the event 'Bent Knees,'' Reduce Stance' for the event 'Stance Too Wide,' or 'Fasten The Reps' for the event 'Reps Too Slow.''

By way of and in continuation to the example above, referring to FIG. 2A, only one of the multiple events mentioned above may be identified based on priority comparisons and may correspond to 'Bent Knees'. Additionally, the user 202 may be a healthy individual. Upon identifying this event, the adaptive feedback engine may render the feedback 'Keep Knees Straight' to the user 202. The feedback may be rendered contemporaneous to identification of occurrence of the event 'Bent Knees' event. The feedback may be rendered via the display of the smart device 200, as depicted in the FIG. 2A. Alternatively, the feedback may be voice-based and may thus be shared with the user 202 via headphones, inbuilt speakers of the smart device 200, or the speaker coupled to the smart device 200. In some implementations, the feedback may be a haptic feedback. The haptic feedback may be provided to the user, via haptic devices placed on body parts of the user 202 that may be activated to generate a vibration or force. Thus, an intensity of vibration may indicate the degree or error and subsequent correction required. It will be apparent that multiple feedbacks may be provided at the same instant, when the mode of rendering these feedbacks in non-overlapping and non-interfering. For example, all the following events may be detected at the same instant, 'Knees Too Close,' 'Bent Knees,' and 'Reps Too Slow.' In such case, the feedback 'Widen Your Stance' may be shared via the display, 'Keep Knees Straight' may be shared via a haptic device attached to the knees, and 'Fasten The Reps' may be shared via any audio output devices at the same time instant. Alternatively, if all these feedbacks can be shard via the same mode, for example, the display, then all the feedbacks may be displayed at the same time, via the same mode.

In another scenario, by the time a feedback is to be rendered, the event may have already passed, and the feedback may not be relevant any longer. By way of an example, the event 'Knees Too Close' may be detected and by the time the associated feedback, i.e., 'Widen Your Stance' is ready to be rendered to the user 202, the user 202 may have switched from the jumping jack exercise to a high knees exercise, as depicted via a dotted line in FIG. 2B. In other words, the feedback 'Widen Your Stance' may no longer be valid. Thus, in this case, the feedback may not be rendered to the user 202.

In an embodiment, an event may have happened repeatedly, and feedback may have been provided to the user for the same each time. However, in spite of the repeated feedback, the user may still not be adhering to these feedbacks. In such case, on subsequent occurrence of the same event, the feedback may be rendered in a different and more assertive manner, which may be able to get attention of the user. By way of an example, the intensity of haptic feedback may be increased in each subsequent repetition of the same feedback. By way of another example, tone and loudness of these feedback may be increased in each subsequent repetition to grab attention of the user.

Figure 2B:
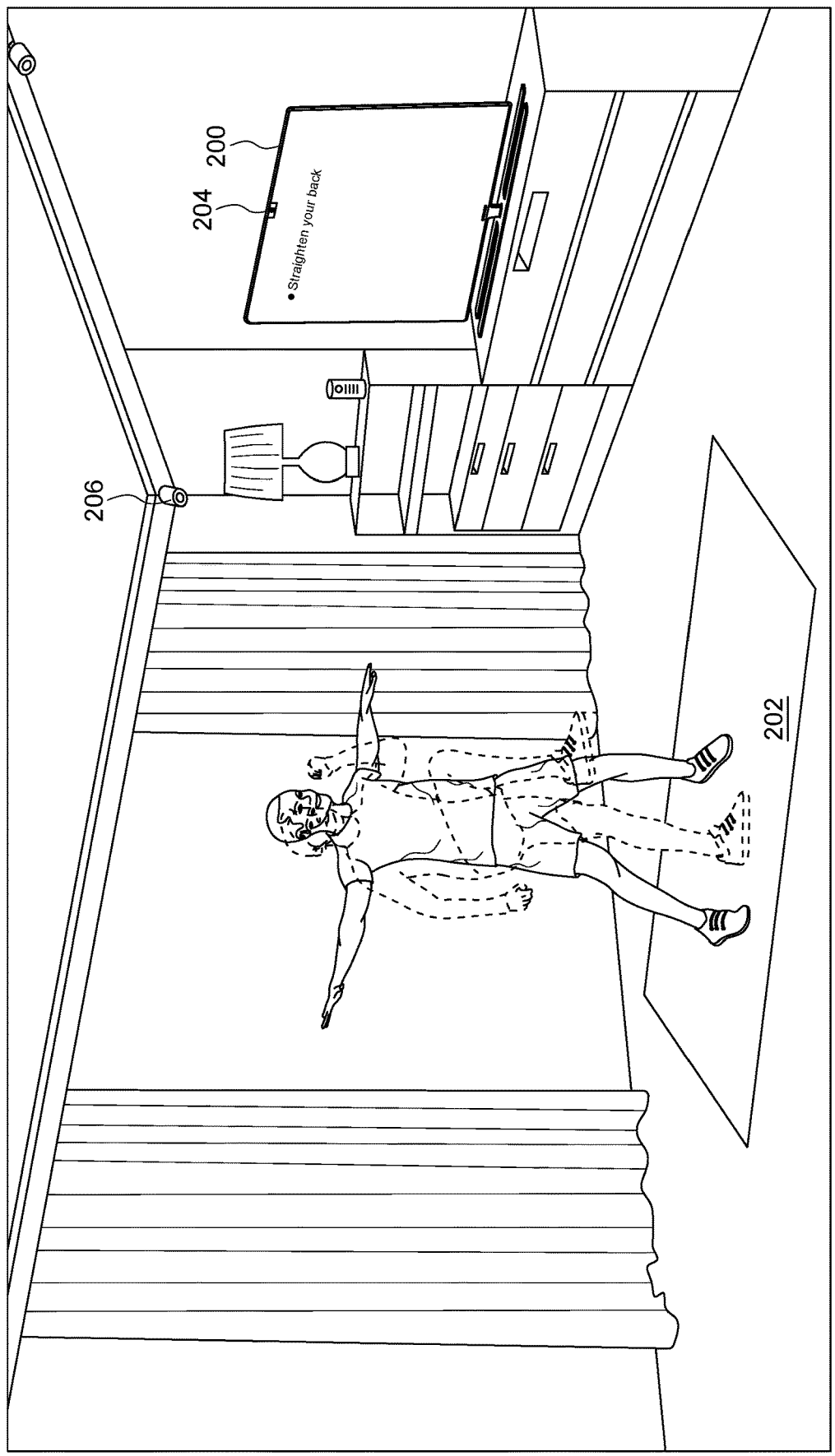
Figure 2C:
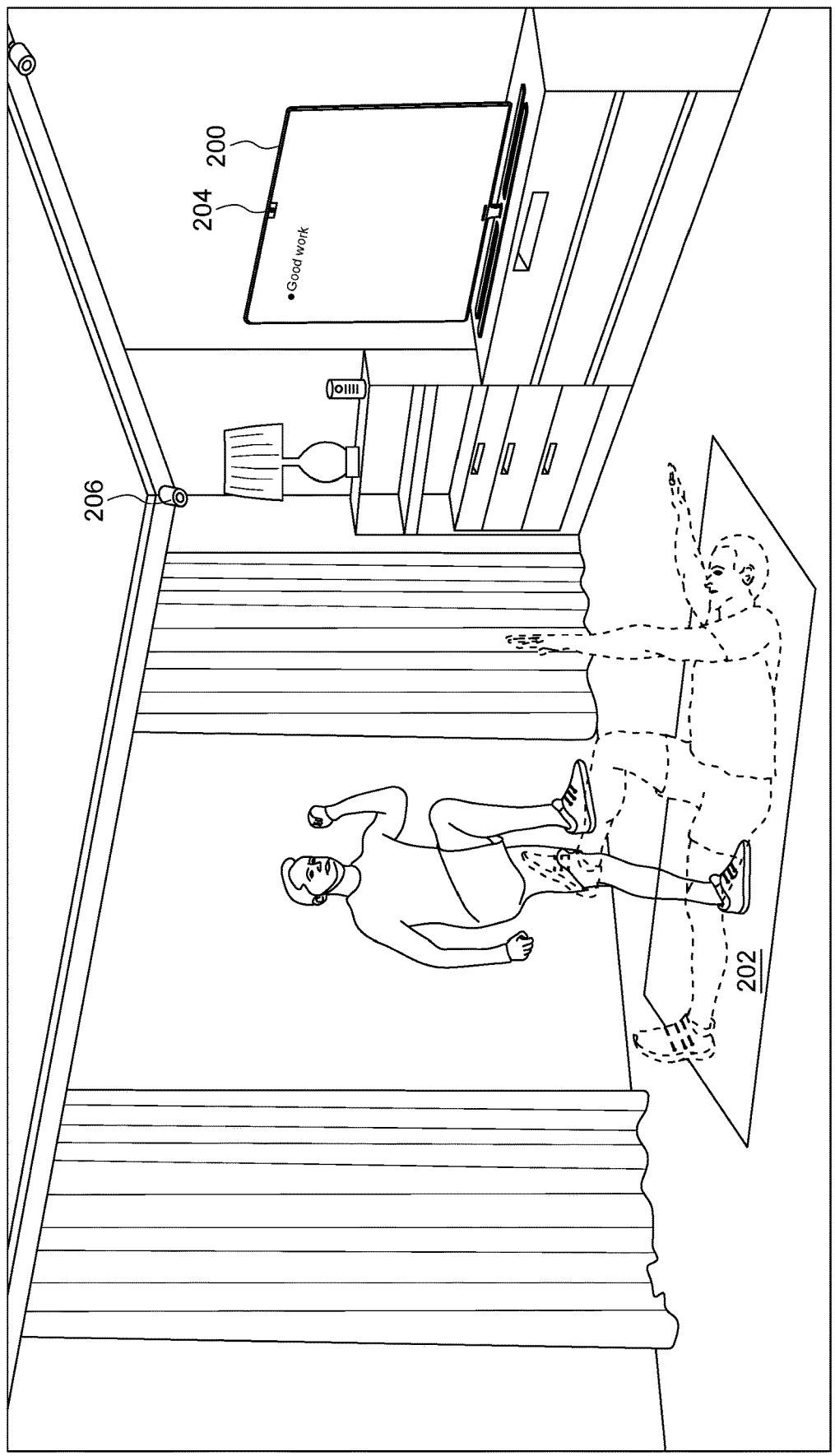

Referring now to FIG. 2C, the user 202 may now be performing the high knees exercise, which is the next exercise in the circuit. Multiple events that may be identified during this exercise may include, 'Knees Too Low,' 'Back Bending,' or 'Slow Reps.' In a manner similar to the examples discussed above, feedback associated with one or more of these events may be rendered within the feedback rendering time window to the user 202. The feedback for these events may be as follows: 'Raise Knees Higher' for the event 'Knees Too Low,'' 'Straighten Your Back' for the event 'Back Bending,' and 'Faster Reps' for the event 'Slow Reps.' As depicted in FIG. 2B, the display of the smart device 200 may be used to display the feedback 'Straighten Your Back' to the user 202.

As depicted in FIG. 2C, the user 202 may be transitioning from performing the 'High Knees' exercise to performing the 'Dead Bug' exercise, as depicted via dotted lines in the FIG. 2C. In this exemplary implementation, since the user 202 is following and adhering to feedbacks as shared with the user 202, a feedback of 'Good Work' may also be displayed to the user 202 as an encouragement or appreciation for the user.

Further, while performing the 'dead bug' exercise, one or more of the following events may be identified: 'moving too fast,' 'lifting head,' or 'unstable foot.' In a manner similar to the examples discussed above, feedback associated with one or more of these events may be rendered within the feedback rendering time window to the user 202. The feedback for these events may be as follows: 'Move slow' for the event 'Moving too fast,' 'Keep your head stable on ground' for the event 'lifting head,' and 'Keep foot stable' for the event 'Unstable foot.' As depicted in FIG. 2C, the display of the smart device 200 may be used to display the feedback 'Keep your head stable on ground' to the user 202.

Figure 2D:
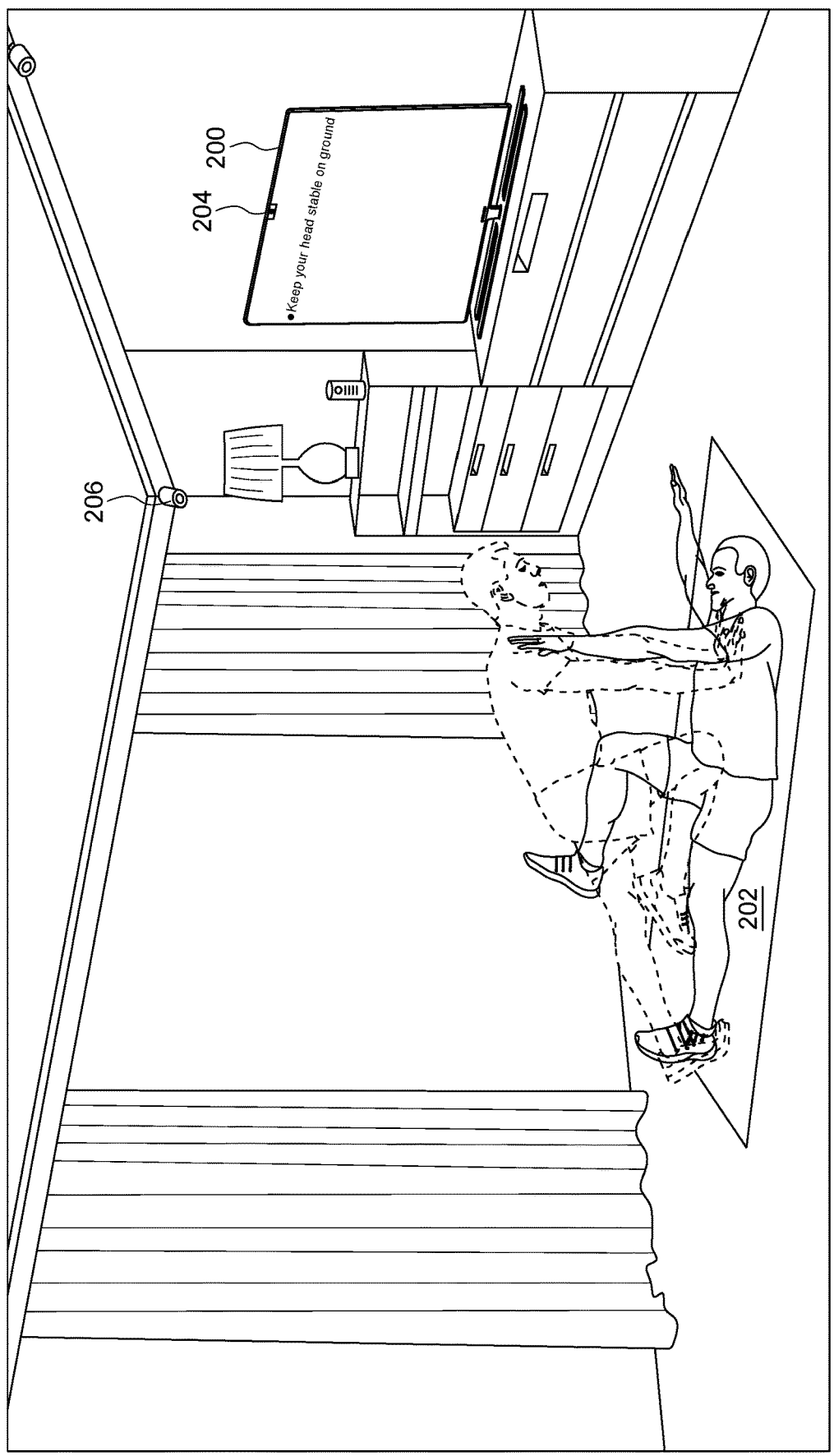
Figure 2E:
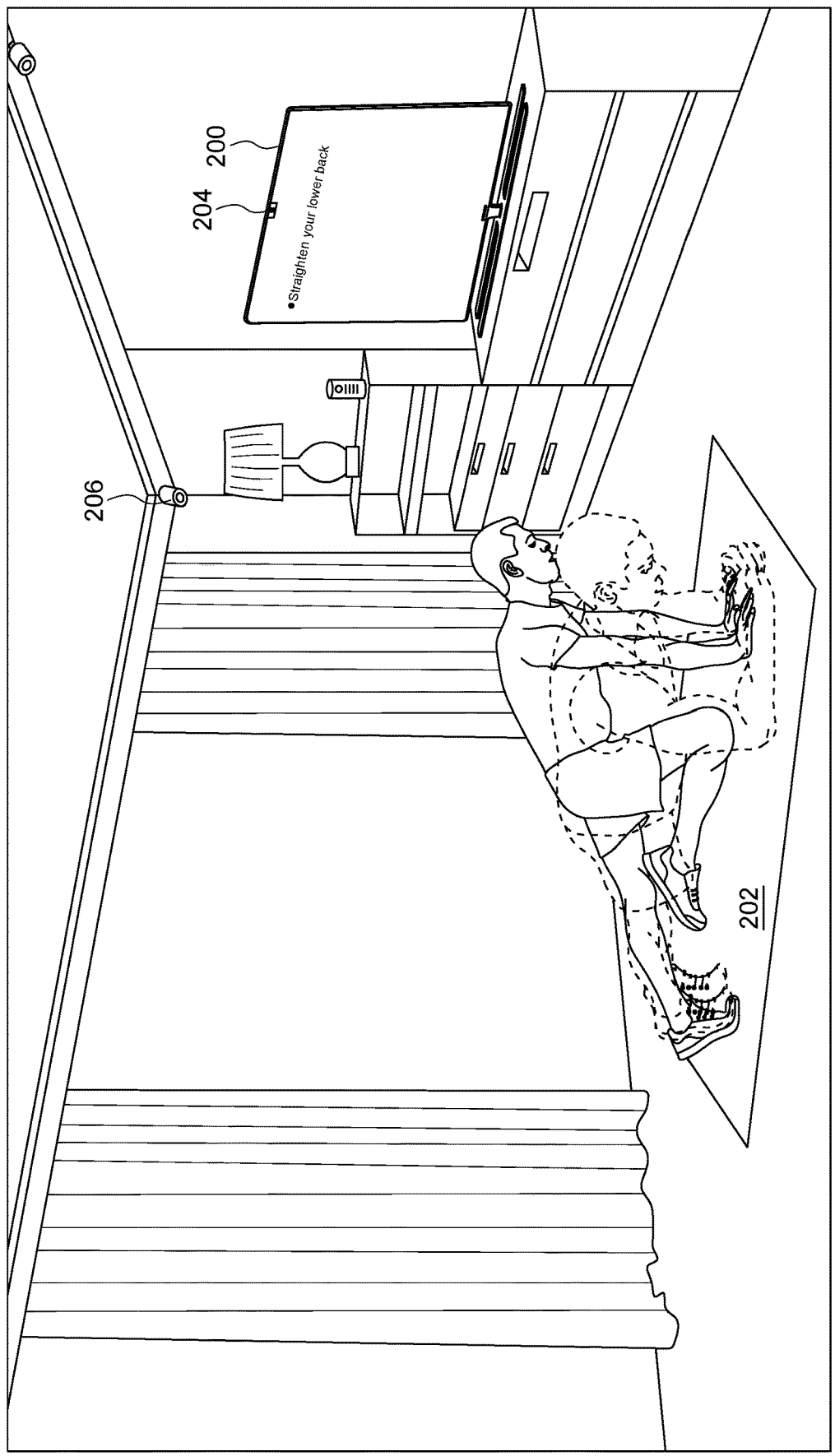
Figure 2F:
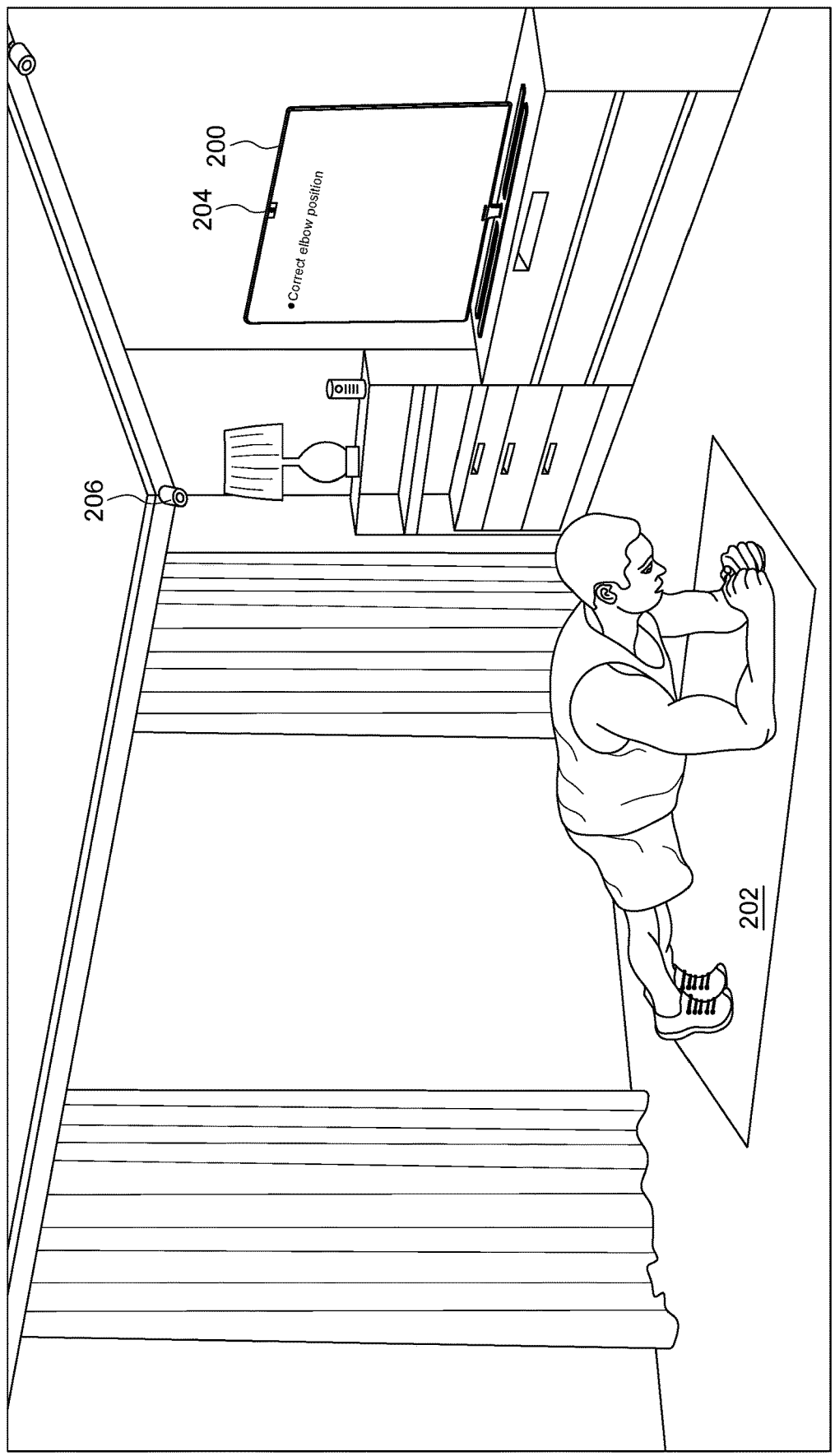

Further, as depicted via the FIG. 2D, after performing the 'dead bug' exercise, the user 202 may transition into performing the 'mountain climber' exercise as depicted via a dotted line in the present FIG. 2D. In a similar manner as explained in FIGS. 2A-2C, in the FIG. 2E, the user 202 may have changed his position to performing 'push plank' exercise represented via a dotted line and further depicted in the FIG. 2F. In a manner similar to the examples discussed above, feedback associated with one or more of events identified while the user 202 is performing the 'mountain climber' or the 'push plank' exercises may be rendered within the feedback rendering time window to the user 202. These feedbacks may be rendered based on priority of associated events when mode of rendering is overlapping and/or interfering. Alternatively, all of the relevant feedback in the current context and the available feedback rendering time window may be rendered at the same time instant, when mode of rendering is non-overlapping and/or non-interfering.

To further elaborate on the manner in which feedback is rendered to the user 202, the feedback may be rendered in an aural form (audio-based feedback), a visual form (video-based feedback, which may be static or dynamic), as haptic feedback, or the feedback may also be in the form of augmented reality or virtual reality elements, for example, within Metaverse. The visual form may include text in combination with various graphics displayed via a Graphical User Interface (GUI). The aural or audio feedback may be audio instructions shared with the user 202 via the speakers of the smart device 200 or headphones/earphones worn by the user 202. The feedback or instructions may be related to a corrective action with regards to each of the circuit training workout performed by the user 202 or may be messages of encouragement, appreciation, or motivation for the user 202. By way of an example, the feedback rendered to the user 202 while performing the circuit training workout with a group of people may include 'you are a best performer in the group', 'you are top performer in this group', and 'you can do better'. The audio feedback may also include rhythm audio cues, such as a metronome, which may be used to guide the user as to repetitions of an exercise or pace of performing an exercise. The visual feedback may include the same instructions that are displayed to the user 202 via the display screen of the smart device 200. Thus, the visual feedback, for example, may include instructions in textual form that may be displayed on the smart device 200. Alternatively, visual feedback may be UI elements overlayed over a live video or an avatar (for example, in metaverse or otherwise) of the user 202.

Figure 3:
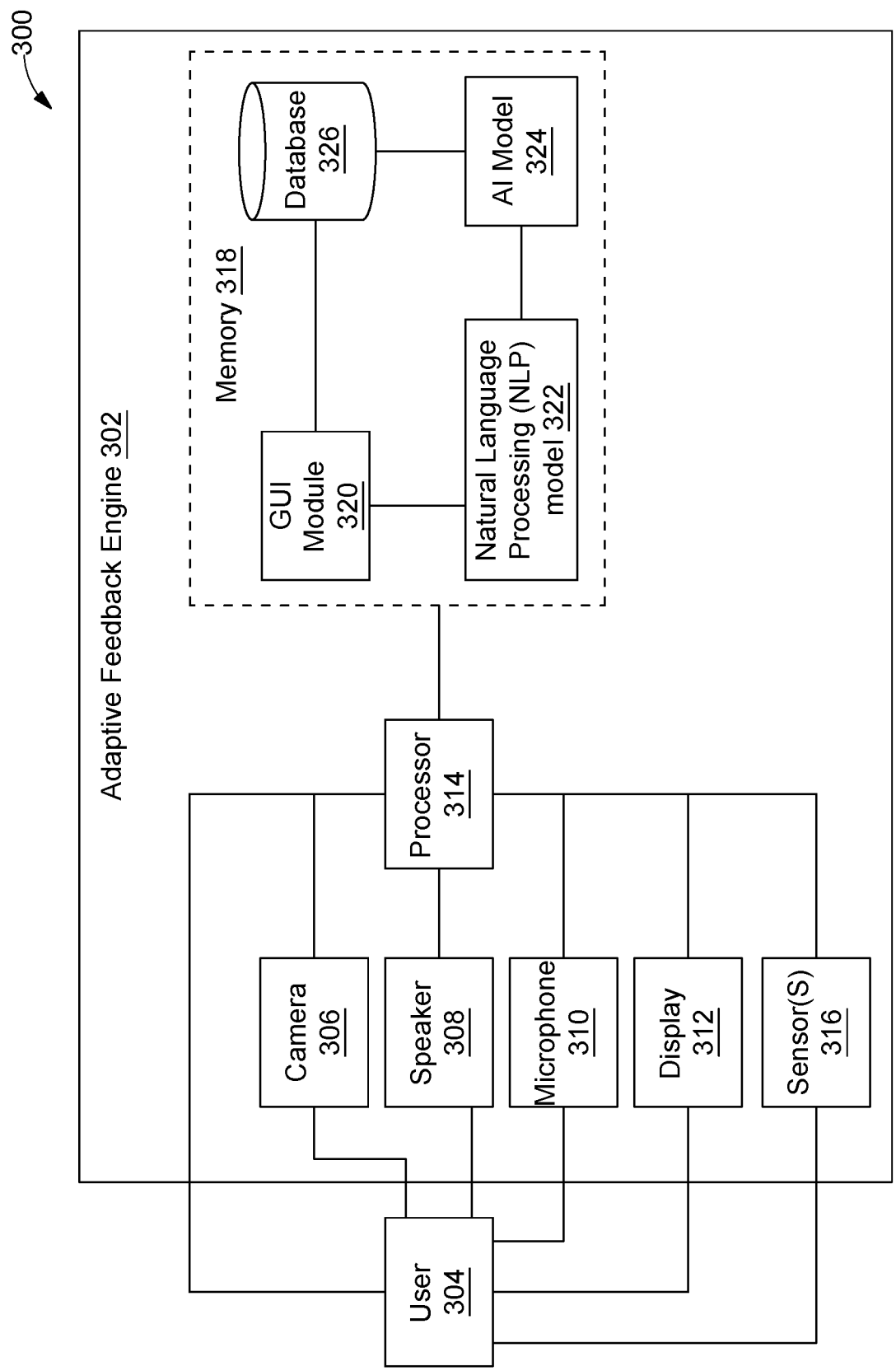
FIG. 3 illustrates a functional block diagram of an exemplary system for providing language based adaptive feedback to users, in accordance with some embodiments.

Referring now to FIG. 3, a functional block diagram of a system 300 for providing language based adaptive feedback to a user 304 is illustrated, in accordance with some embodiments. The system 300 includes an adaptive feedback engine 302. The adaptive feedback engine 302 may correspond to the adaptive feedback engine defined in the FIG. 1 and the FIG. 2. Further, the adaptive feedback engine 302 may include a camera 306, a speaker 308, a microphone 310, a display 312, a processor 314, one or more sensors 316, and a memory 318. The memory 318 further includes a Graphical User Interface (GUI) module 320, a Natural Language Processing (NLP) model 322, an AI model 324, and a database 326.

Initially, the adaptive feedback engine 302 may be configured based on a user-profile of the user 304, a location of the user 304, or an input language provided by the user 304. The adaptive feedback engine 302 may also receive information related to target language associated with the user 304. In some configurations, the NLP model 322 may be trained based on information (i.e., the user-profile, the location, and the input language) associated with the user 304. In some embodiment, the NLP model 322 may be trained using multiple languages and thereafter may determine the target language associated with the user 304 in order to provide the feedback to the user 304 in the target language. The NLP model 322 may be based on elastic stretching mechanism as discussed before. This has already been explained in detail before. In order to process the input language of the user 304, the NLP model 322 process a voice-based input received from the user. In order to process the voice-based input, the NLP model 322 may correct spelling, identify synonyms, interpret grammar, recognize sentiment, and break the voice-based input into words and sentences for further processing. This may be done so that the voice-based input is easily understood by the AI model 324.

Once the NLP model 322 has processed the voice-based input (alternatively the text input request), the NLP model 322 may send the processed voice-based inputs to the AI model 324. The adaptive feedback engine 302 may further include various input modules for receiving and interpreting gesture performed by the user 304, inputs provided via controllers and/or sensors. In this case, these input modules may share interpreted and processed inputs with the AI model 324. Upon receiving the processed inputs or detected events, the AI model 324 may be trained to render the feedback to the user 304 in his target language. The feedback may be rendered to the user 304 using the GUI module 320 via the display 312. By way of an example, the user 304 may be performing a circuit training workout or any other activity. While the user 304 may be performing the circuit training workout or any other activity, the AI model 324 may continuously monitor the user 304 via the camera 306 or other sensors (not shown) in real time to identify at least one event that may require rendering of automated feedback to the user 304.

By way of an example, the AI model 324 may continuously monitor the user 304 via the camera 306 by capturing a video of the user 304 while performing various exercises. In an embodiment, each of the at least one event may be associated with the feedback. By way of an example, in reference to FIG. 1, when the user 304 is the user of the autonomous vehicle 102, then the at least one event may correspond to over speeding of the autonomous vehicle 102. Further, in reference to FIG. 2, when the user 304 is the user 202, then the at least one event may correspond to an incorrect body posture of the user 202 while performing an exercise.

In addition to identifying occurrence of the at least one event, the AI model 324 may determine ambient factors at and approximate to the time of occurrence of each of the at least one event. The AI model 324 may also receive or extract user attributes. The ambient factors and the techniques to capture the same has already been explained in detail in conjunction with FIG. 1 and FIG. 2A.

Upon determining the ambient factors and the user attributes, the AI model 324 may determine a criticality factor associated with each of the at least one event based on the ambient factors and the user attributes. The determined criticality factor may enable determination of a seriousness, importance, and/or relevance of each of the at least one event. Once the criticality factor is determined, the AI model 324 may determine a feedback rendering time window for each of the at least one event. The feedback rendering time window may be determined after identifying occurrence of each of the at least one event. Moreover, the feedback rendering time window for an event may be determined based on the associated criticality factor and the user attributes.

Once the feedback rendering time window is determined, the AI model 324 may identify feedback attributes of the associated feedback for each of the at least one event. The feedback attributes may be determined based on the determined feedback rendering time window, the user attributes, and the target language. Examples of the feedback attributes may include, but is not limited to, category of feedback (for example, warning, error, generic information, trivia, caution, danger, encouragement, achievements, and position in a group activity), mode of delivering the feedback (for example, audio, video, or text), required clarity, time required to render the feedback, type of activity/event for which the feedback is generated, or number of users receiving the feedback. Upon identifying the feedback attributes of the associated feedback, the AI model 324 may assign a priority to each of the at least one event based on the associated feedback rendering time window and the feedback attributes. This has been explained in detail in reference to FIG. 9 to FIG. 12.

Further, the AI model 324 may identify one or more events from the at least one event based on the assigned priority. In an embodiment, the priority determined for each of the one or more events may be greater than a threshold. Once the one or more events are identified, the AI model 324 may render the feedback associated with each of the one or more events to the user 304. It should be noted that, the AI model 324 may render the feedback contemporaneous to identifying occurrence of the one or more events. The feedback may be rendered using the GUI module 320 via the display 312.

The feedback rendered to the user 304 may be in one or more of an aural form, a visual form, or as a haptic feedback. Examples of the feedback may include, but is not limited to 'good work,' 'keep your back straight,' 'stretch your arms,' 'time taken to complete a set of the exercise', 'incorrect posture or pace' of the user while performing the at least one exercise, absolute exercise performance proficiency of the user, relative performance proficiency of the user, best time taken to perform at least one exercise, warnings associated with each of the at least one events, over speeding warning, low fuel warning, road condition warning, or traffic warning. The feedback may also include content related to user encouragement and motivation. It may be noted that feedback in the aural form may be provided to the user 304 via the speaker 308 and feedback in the visual form may be rendered to the user 304 via the display 312. The haptic feedback may be rendered to the user 304 via haptic devices placed on the user 304. This has already been explained in detail in conjunction with FIGS. 1 and 2. Further, the database 326 may be used to store information associated with the user 304, the one or more events identified, the assigned priority, and the feedback rendered to the user 304. Moreover, the database 326 may be periodically updated with new events identified and information associated with the new events.

It should be noted that all such aforementioned modules 306-326 may be represented as a single module or a combination of different modules. Further, as will be appreciated by those skilled in the art, each of the modules 306-326 may reside, in whole or in parts, on one device or multiple devices in communication with each other. In some embodiments, each of the modules 306-326 may be implemented as dedicated hardware circuit comprising custom application-specific integrated circuit (ASIC) or gate arrays, off-theshelf semiconductors such as logic chips, transistors, or other discrete components. Each of the modules 306-326 may also be implemented in a programmable hardware device such as a field programmable gate array (FPGA), programmable array logic, programmable logic device, and so forth. Alternatively, each of the modules 306-326 may be implemented in software for execution by various types of processors (e.g., processor 314). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

Figure 4:
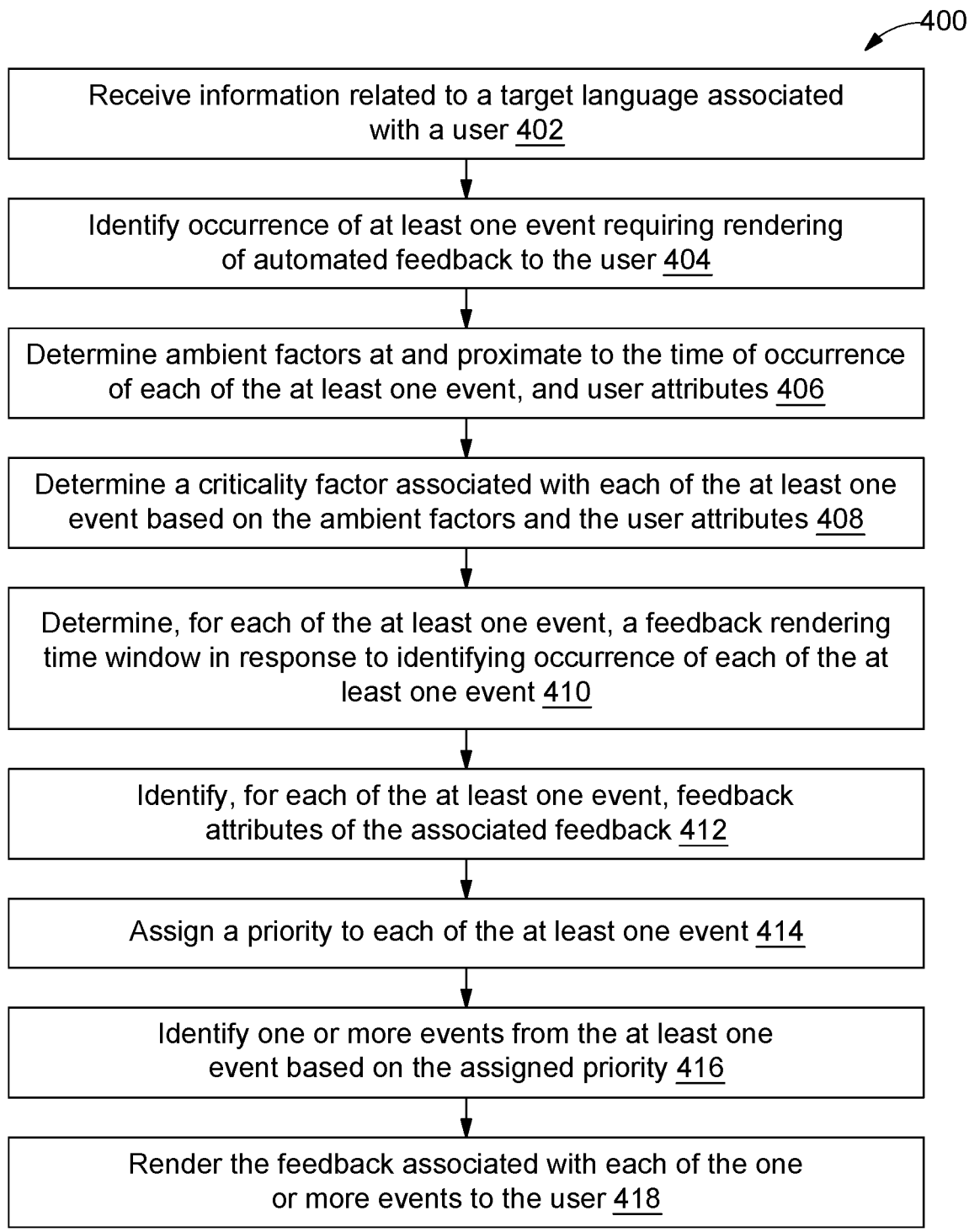
FIG. 4 illustrates a flowchart of a method for providing language based adaptive feedback to users, in accordance with some embodiment.

Referring now to FIG. 4, a flowchart of a method 400 for providing language based adaptive feedback to users is illustrated, in accordance with some embodiment. At step 402, information related to a target language associated with a user may be received. The target language may be determined based on at least one of a user-profile, a location of the user, interactions with the user, or an input language provided by the user. As explained in FIG. 3, in order to determine the target language of the user, initially, the adaptive feedback engine 302 may be configured using the information associated with the user. In some embodiment, the adaptive feedback engine 302 may be configured using multiple language.

At step 404, an occurrence of at least one event that may require rendering of automated feedback to the user is determined. In an embodiment, each of the at least one event may be associated with a feedback. By way of an example, while performing an exercise (e.g., jumping jack), the at least one event determined may correspond to 'hands/elbows bent' of the user. Further, at step 406, ambient factors at and proximate to the time of occurrence of each of the at least one event, and user attributes may be determined.

Once the ambient factors and the user attributes are determined, then based on the ambient factors and the user attributes, at step 408, a criticality factor associated with each of the at least one event may be determined. The determined criticality factor may enable determination of seriousness, relevance, or importance of each of the at least one event. Upon determining the criticality factor, at step 410, a feedback rendering time window may be in response determined for each of the at least one event. In an embodiment, the feedback rendering time window may be determined based on identification of an occurrence of each of the at least one event. Moreover, in order to determine the feedback rendering time window for each of the at least one event, the associated criticality factor and the user attributes may be used.

Further, upon determining the feedback rendering time window, at step 412, for each of the at least one event, feedback attributes of the associated feedback may be identified. In an embodiment, the feedback attributes may be identified based on the determined feedback rendering time window, the user attributes, and the target language. Examples of the feedback attributes may include, but is not limited to, clarity, specific to event, time for rendering, meaningful to user. Upon determining the feedback attributes associated with each of the at least one event, at step 414, a priority may be assigned to each of the at least one event. In an embodiment, the priority may be assigned based on the associated feedback rendering time window and the feedback attributes. A method of assigning the priority has been explained in detail in conjunction with FIG. 9 and FIG. 12.

Once the priority is assigned, at step 416, one or more events from the at least one event may be identified based on the assigned priority. In an embodiment, the priority determined for each of the one or more events may be greater than a threshold. In other words, the requirement for rendering the feedback for the one or more events may be greater. Further, at step, 418, the feedback associated with each of the one or more events may be rendered to the user. In an embodiment, the feedback may be rendered contemporaneous to identifying occurrence of the one or more events. A method of rendering the feedback associated with each of the one or more events to the user has been explained in greater detail in conjunction with FIG. 5 and FIG. 6.

Figure 5:
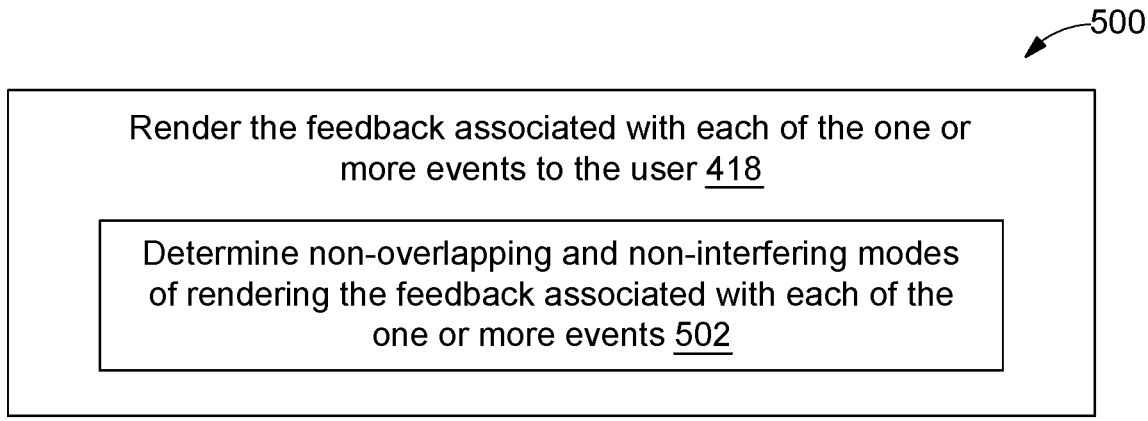
FIG. 5 illustrates a flowchart of a method for rendering a feedback associated with each of one or more events to a user, in accordance some embodiment.

Referring now to FIG. 5, a flowchart of a method 500 for rendering a feedback associated with each of one or more events to a user is illustrated, in accordance some embodiment. As mentioned via the step 418, in order to render the feedback associated with each of the one or more events to the user, at step 502, non-overlapping and non-interfering modes of rendering the feedback associated with each of the one or more events may be determined. This has already been explained in detail in the aforementioned description.

Figure 6:
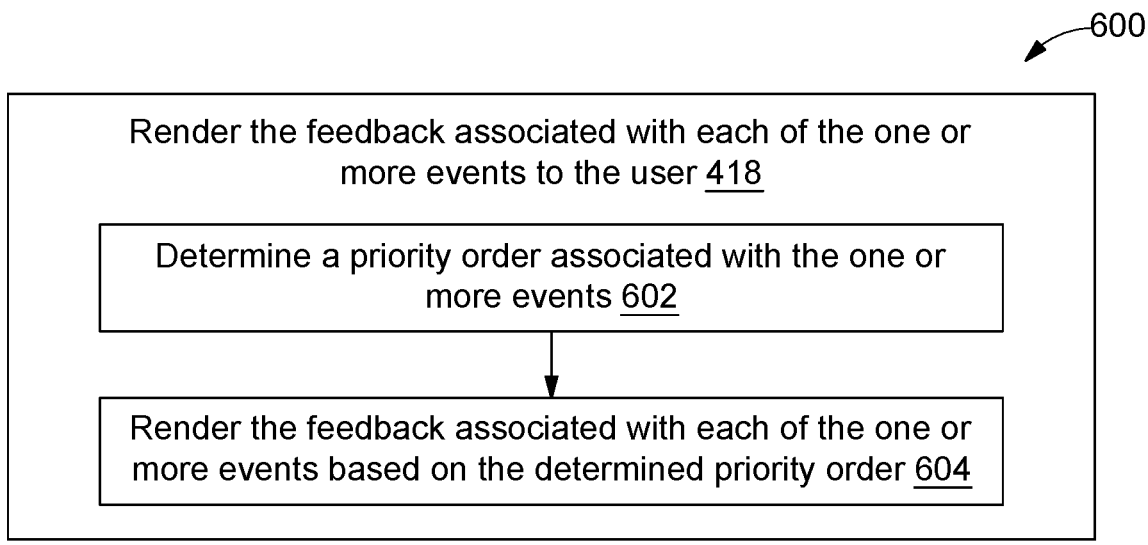
FIG. 6 illustrates a flowchart of another method for rendering a feedback associated with each of one or more events to a user, in accordance some embodiment.

Referring now to FIG. 6, a flowchart of another method 600 for rendering a feedback associated with each of one or more events to a user is illustrated, in accordance some embodiment. As mentioned via the step 418, in order to render the feedback associated with each of the one or more events to the user, at step 602, a priority order associated with the one or more events may be determined. In other words, based on the priority assigned to each of the one or more events, the priority order associated with each of the one or more events may be determined. Once the priority order is determined, at step 604, the feedback associated with each of the one or more events may be rendered based on the determined priority order. Methods for determining the priority order has been explained in detail in conjunction with FIG. 7 and FIG. 8.

By way of an example, suppose the one or more events identified from each of the at least one event may include a set of four events, i.e., 'event 1', 'event 2', 'event 3', and 'event 4'. Once each of the set of four events are identified, then the priority associated with each of the set of four events may be determined. The priority order may then be determined based on the priority assigned to each of the set of four events. By way of an example, the priority assigned to each of the set of four events, i.e., 'event 1', 'event 2', 'event 3', and 'event 4' may correspond to '3', '1', '4', '2', respectively. Then, based on the assigned priority, each of the set of four events may be arranged in the priority order, i.e., in increasing order of the assigned priority starting with the event with which is highest in priority, i.e., the priority '1'. For example, based on the determined priority order, arrangement of each of the set of four events may correspond to 'event 2', 'event 4', 'event 1', and 'event 3'. Further, based on the determined priority order, the feedback associated with the 'event 2' may be rendered first as the priority '1' is assigned to the 'event 2'. Similarly, after rendering the feedback associated with the 'event 2', the feedback associated with the 'event 4', the 'event 1', and the 'event 3' may be rendered to the user based on the determined priority order. In an alternate implementation, for non-overlapping and non-interfering modes of rendering feedbacks, all such feedbacks may be rendered at the same time.

Figure 7:
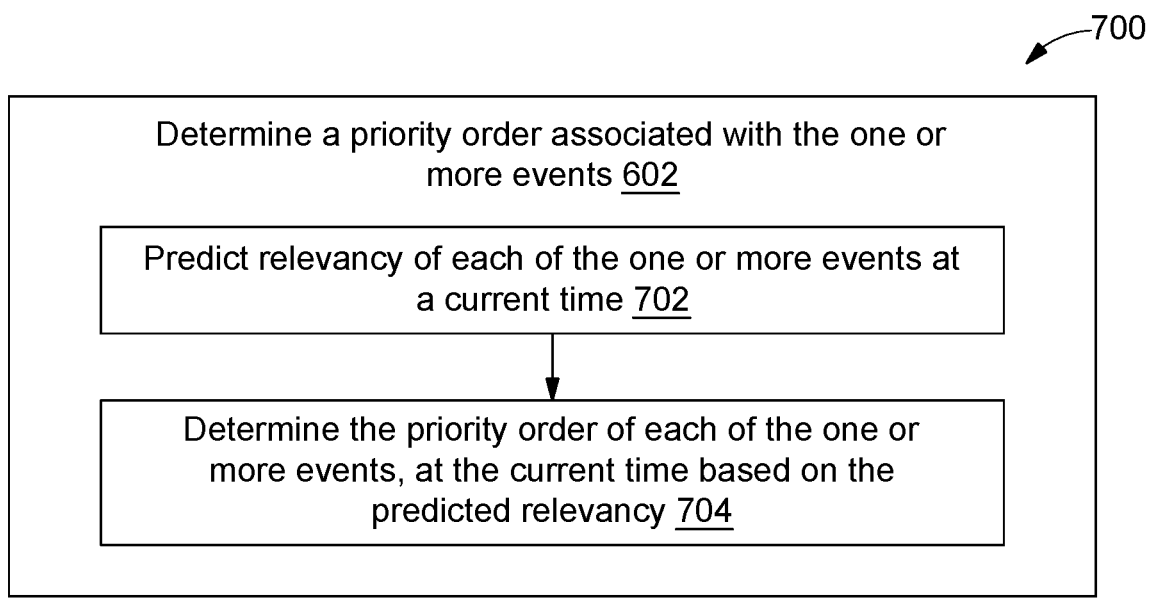
FIG. 7 illustrates a flowchart of a method for determining a priority order associated with one or more events, in accordance with some embodiment.

Referring now to FIG. 7, a flowchart of a method 700 for determining a priority order associated with one or more events is illustrated, in accordance with some embodiments. In reference to FIG. 6, as mentioned via the step 602, in order to determine the priority order associated with the one or more events, at step 702, a relevancy of each of the one or more events may be predicted at a current time. As discussed in FIG. 1, the relevancy of the events may be determined based on change in the current context. In other words, in order to determine the priority order, a significance (or importance) of each of the one or more events may be determined for that current time and the current context. Once the relevancy of each of the one or more events for the current time is predicted, at step 704, the priority order of each of the one or more events may be determined at the current time based on the predicted relevancy.

By way of an example, consider a scenario where two events (for example, 'back not straight' and 'hands slightly bent') may have been identified as the one or more events from each of the at least one event based on the threshold. Upon identifying the two events, the relevancy, seriousness, or importance of each of the two events may be determined at the current time and the current context. The event 'back not straight' is determined as being more relevant than the event 'hands slightly bent,' as the user may have slightly crooked hands, therefore, the priority order associated with each of the two events at the current time may correspond to the event 'back not straight' followed by the event 'hands slightly bent.' As a result, feedback associated with the event 'back not straight' may be rendered first, followed by the feedback associated with the event 'hands slightly bent.'

Figure 8:
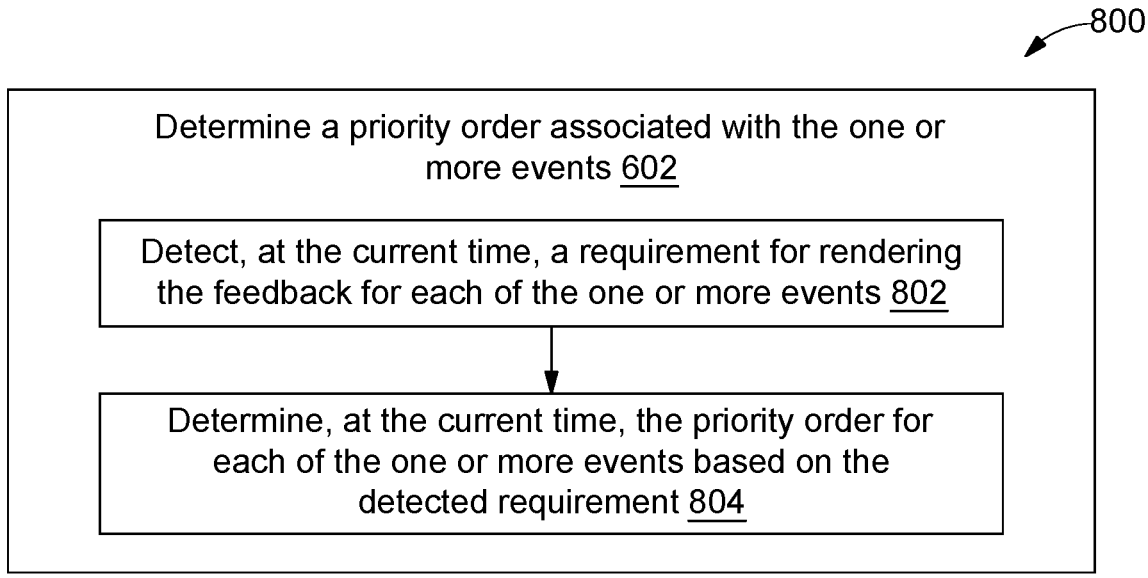
FIG. 8 illustrates a flowchart of another method for determining a priority order associated with one or more events is illustrated, in accordance with some embodiment.

Referring now to FIG. 8, a flowchart of another method 800 for determining a priority order associated with one or more events is illustrated, in accordance with some embodiments. In reference to FIG. 6, as mentioned via the step 602, in order to determine the priority order associated with the one or more events, at step 802, relevancy of a condition for rendering the feedback for each of the one or more events may be detected at a current time. In other words, a detection may be done to identify whether the one or more events warrants the feedback at the current time or not. Based on the detected relevancy of the condition for rendering the feedback, at step 804, the priority order may be determined for each of the one or more events, at the current time.

By way of an example, consider a scenario, where, while performing the 'jumping jacks' exercise the events 'knees too close' and 'slow reps' may be identified based on the threshold and the assigned priority. Initially, 'knees too close' may be assigned a higher priority, however, before rendering this feedback, it may be determined whether the user is still performing 'jumping jacks' with knees to close or not. The user may correct his stance in subsequent repetitions, thus the condition for rendering the feedback is no longer relevant. As a result, the other event, i.e., 'slow reps' may be assigned higher priority and a feedback associated with that be rendered to the user.

Figure 9:
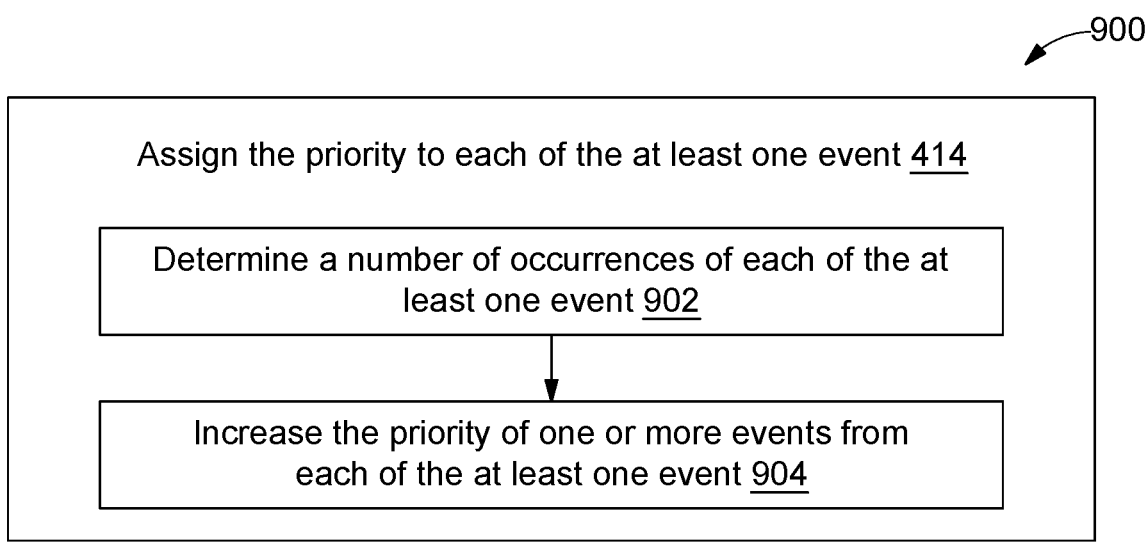
FIG. 9 illustrates a flowchart of a method for assigning a priority to each of at least one event, in accordance with some embodiment.

Referring now to FIG. 9, a flowchart of a method 900 for assigning a priority to each of at least one event is illustrated, in accordance with some embodiments. In reference to FIG. 4, in order to assign the priority as mentioned via the step 414, at step 902, a number of occurrences of each of the at least one event may be determined. Upon determining the number of occurrences of each of the at least one event, at step 904, the priority of one or more events from each of the at least one event may be increased. In an embodiment, the priority of the one or more events may be increased upon determining the number of occurrences of the one or more event to be beyond an occurrence threshold. This has been further explained in detail in conjunction with FIG. 10. By way of an example, for 'jumping jacks', the event 'bent back' may have the lower priority amongst other identified events. However, if the event keeps occurring multiple times, the event may be assigned a higher priority, so that the associated feedback, i.e., 'straighten your back' may be rendered to the user.

Figure 10:
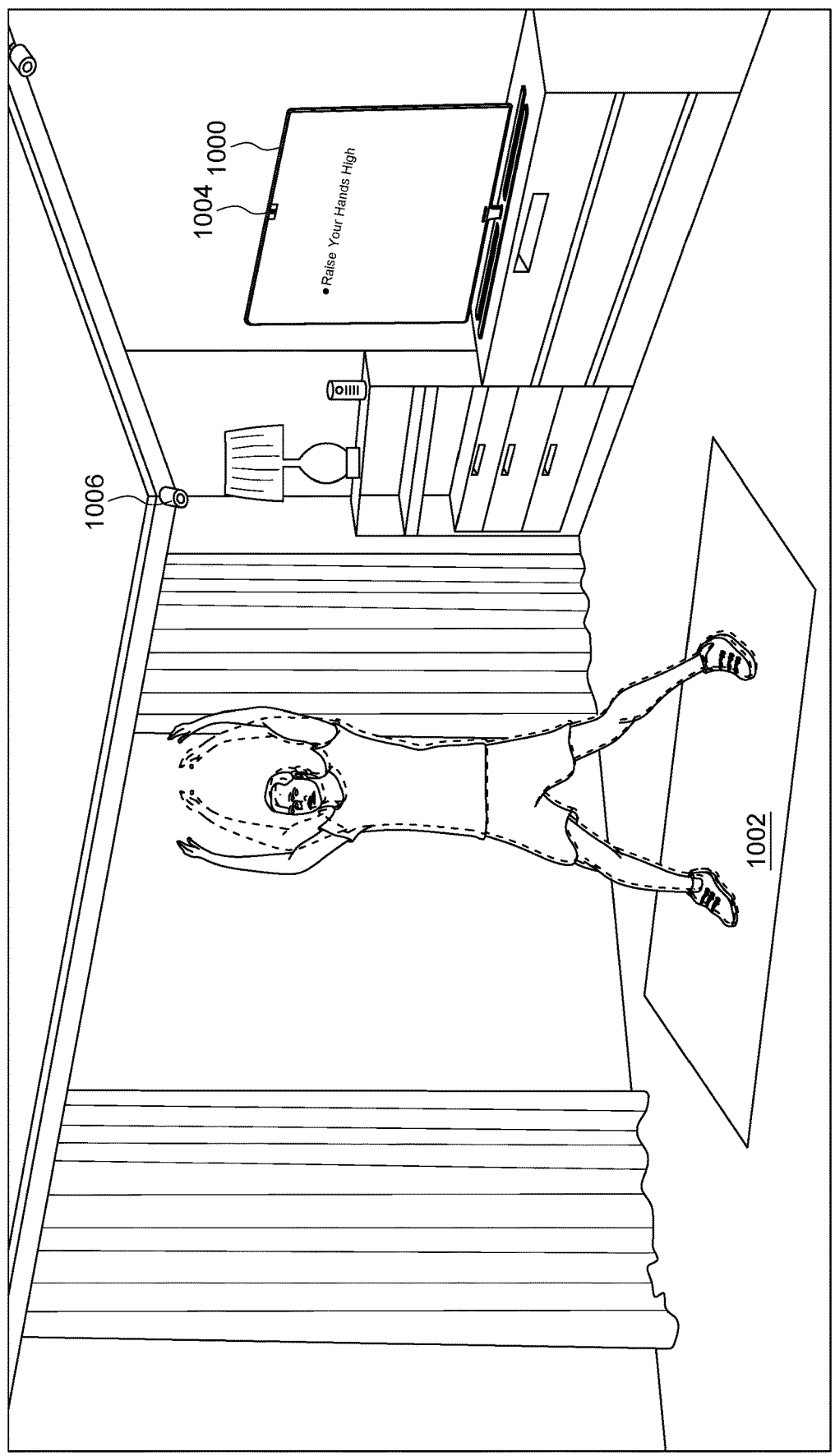
FIG. 10 represents a pictorial depiction of a scenario for assigning a priority to each of at least one event, in accordance with some exemplary embodiment.

Referring now to FIG. 10, a pictorial depiction of a scenario for assigning a priority to each of at least one event is represented, in accordance with some exemplary embodiment. As represented in the present FIG. 10, a user 1002 may be performing the 'jumping jack' exercise. In the present FIG. 10, solid line depicts current posture of the user, i.e., a position in which the user 1002 may be performing the jumping jack exercise. Whereas, the dotted line may represent correct posture of the user, i.e., a position in which the user 1002 must perform the jumping jack exercise. While performing the jumping jack exercise, occurrence of two events, for example, 'knees bent' and 'hands slightly bent' might have identified. It should be noted that, each of the two events may be identified via a camera 1004 of the display device 1000. In reference to FIG. 2, the camera 1006 may correspond to the external camera 206. Upon identifying each of the two events, each of the two events may be processed to assign the priority, described via the step 406 to step 412 in the FIG. 4. For example, the priority '1', and '2' may be assigned to each of the two events, i.e., 'knees bent' and 'hands slightly bent'. Further, based on the assigned priority, i.e., '1' to the event 'knees bent', the feedback associated with the event 'knees bent' may be rendered to the user. Moreover, since the priority of the event 'hands slightly bent' was low, therefore, the feedback associated with the event 'hand slightly bent' may not be rendered.

Now consider a scenario, where, while performing the jumping jack exercise, the event 'hands slightly bent' may have occurred more than '5' times. In other words, the event 'hands slightly bent' may have been detected more than '5' times while the user was performing the jumping jack exercise. Moreover, in the current scenario, a value for the occurrence threshold may be determined to '5' occurrence. It will be apparent that the threshold may vary and may be determined using an AI model, a statistical model, or other algorithmic models. Upon determining the number of occurrences of the event 'hands slightly bent' beyond the occurrence threshold, i.e., the '5' times, the priority assigned to the event 'hands slightly bent' may be increased. In other words, suppose the priority assigned to the event 'hands slightly bent' may be '2'. Then, upon determining occurrence of the event 'hands slightly bent' more than '5' times, the priority assigned to the event 'hands slightly bent' may be increased from '2' to '1'. Once the priority is increased, the feedback associated with the event 'hands slightly bent' may be rendered to the user 1002. The feedback rendered for the event 'hands slightly bent' may correspond to 'raise your hands high' as depicted via a display screen of the display device 1000. In reference to FIG. 2, the display device 1000 may correspond to the smart device 200. In some embodiment, the feedback may be the audio-based feedback. The audio-based feedback may be rendered to the user via an inbuilt speakers of the display device 1000 or speakers configured with display device 1000. As will be appreciated, the priority assigned to each of the at least one event may be increased to render the feedback associated with each of the at least one event based on the number of occurrences of each of the at least one event.

Figure 11:
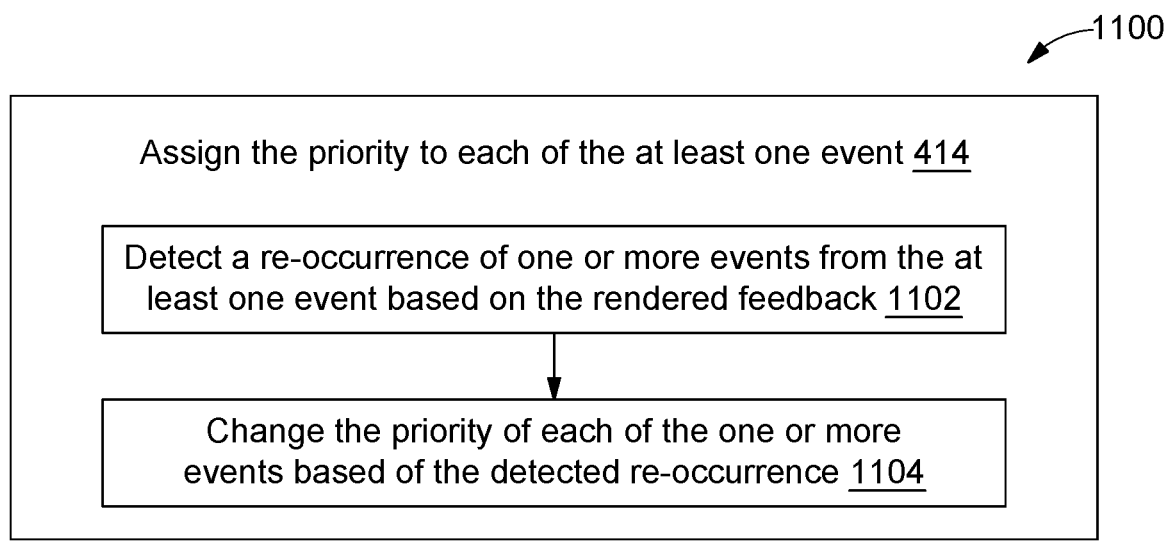
FIG. 11 illustrates a flowchart of another method for assigning a priority to each of at least one event, in accordance with some embodiment.

Referring now to FIG. 11, a flowchart of another method 1100 for assigning a priority to each of at least one event is illustrated, in accordance with some embodiment. In reference to FIG. 4, in order to assign the priority as mentioned via the step 414, at step 1102, a reoccurrence of one or more events from each of the at least one event may be determined. In other words, each of the at least one events for which the feedback may have already been rendered may be determined. Upon determining the reoccurrence of the one or more events, at step 1104, the priority of each of the one or more events may be changed based of the detected reoccurrence and absence of rendering feedback for these reoccurred events. In other words, the priority of each of the one or more events may be lowered in response to identification of rendering of the feedback associated with the one or more events. It should be noted that, the priority of each of the one or more events may be changed to avoid reiteration of rendering of the feedback for the one or more events. This has been explained in greater detail in reference to FIG. 12.

Figure 12:
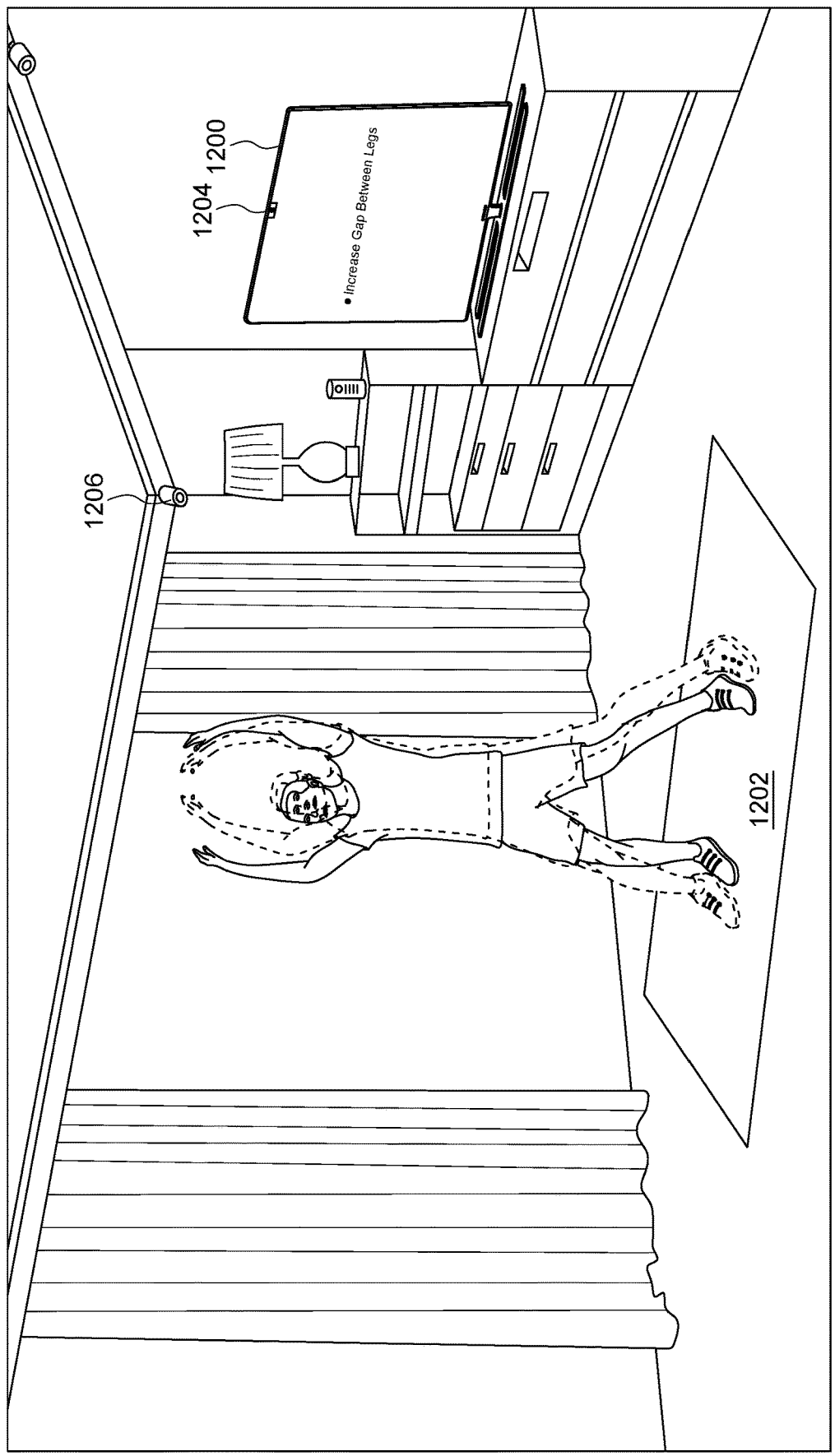
FIG. 12 represents a pictorial depiction of another scenario for assigning a priority to each of at least one event, in accordance with some exemplary embodiment.

Referring now to FIG. 12, a pictorial depiction of another scenario for assigning a priority to each of at least one event is represented, in accordance with some exemplary embodiment. As represented in the present FIG. 12, a user 1202 may be performing a jumping jack exercise. In the present FIG. 12, solid line depicts current posture of the user, i.e., a position in which the user 1202 may be performing the jumping jack exercise. Whereas, the dotted line may represent correct posture of the user, i.e., a position in which the user 1202 must perform the jumping jack exercise. While performing the jumping jack exercise, occurrence of two events, for example, 'legs closer' and 'hands slightly bent' might have identified. It should be noted that, each of the two events may be identified via a camera 1204 of the display device 1200. In reference to FIG. 2, the camera 1206 may correspond to the external camera 206. Upon identifying each of the two events, each of the two events may be processed to assign the priority as described via the step 406 to step 412 in the FIG. 4. For example, the priority '1', and '2' may be assigned to each of the two events, i.e., 'legs closer' and 'hands slightly bent'.

Further, based on the priority assigned, i.e., '1' to the event 'legs closer', the feedback associated with the event 'legs closer' may be rendered to the user. The feedback rendered for the event 'legs closer' may correspond to 'increase gap between legs' as depicted via a display screen of the display device 1200. In reference to FIG. 2, the display device 1200 may correspond to the smart device 200. In some embodiment, the feedback may be the audio-based feedback. The audio-based feedback may be rendered to the user via an inbuilt speaker of the display device 1200 or speakers configured with the display device 1200. It should be noted that, the feedback rendered to the user 1202 may be in the target language determined for the user 1202. Moreover, since the priority of the event 'hands slightly bent' was lower, therefore, the feedback associated with the event 'hand slightly bent' may not be rendered.

Now consider a scenario, where, while performing the jumping jack exercise, the event 'legs closer' may have re-occurred. In other words, the event 'legs closer' may have been identified again while the user 1202 was performing the jumping jack exercise. Then, upon determining re-occurrence of the event 'legs closer', before assigning the priority, a check may be performed to detect whether the feedback associated with the 'legs closer' may have been rendered before. Based on the check performed, upon detecting that the feedback associated with the event 'legs closer' has already been rendered. Then, the priority of the event 'legs closer' may be changed. In other words, once the feedback associated with the event 'legs closer' was rendered, then, based on the check performed, the priority assigned to the event 'legs closer' may be reduced. It should be noted that, the priority of the event 'legs closer' may be changed to avoid reiteration of rendering of the feedback associated with the event 'legs closer'. Now since the feedback associated with the event 'legs closer' may need not to be re-rendered based on the check performed, hence the feedback associated with the event 'hands slightly bent' may be rendered.

Figure 13:
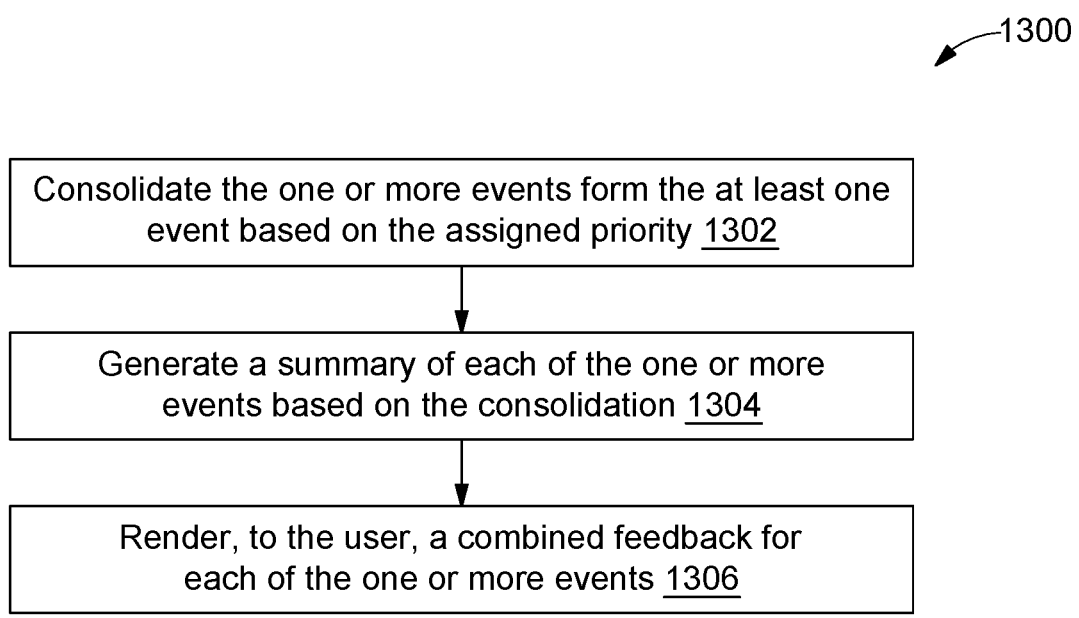
FIG. 13 illustrates a flowchart of a method for rendering a combined feedback for one or more events, in accordance with some embodiment.

Referring now to FIG. 13, a flowchart of a method 1300 for rendering a combined feedback for one or more events is illustrated, in accordance with some embodiment. At step 1302, the one or more events form the at least one event may be consolidated based on the assigned priority. In an embodiment, the priority assigned to the one or more events may be similar or related. Once the one or more events with similar assigned priority are merged, at step 1304, a summary, or consolidated events may be generated for each of the one or more events based on the consolidation. Upon generating the summary, at step 1306, a consolidated feedback may be rendered for each of the one or more events. In an embodiment, the combined feedback may be generated based on the generated summary. This has been further explained in detail in conjunction with FIG. 14.

Figure 14:
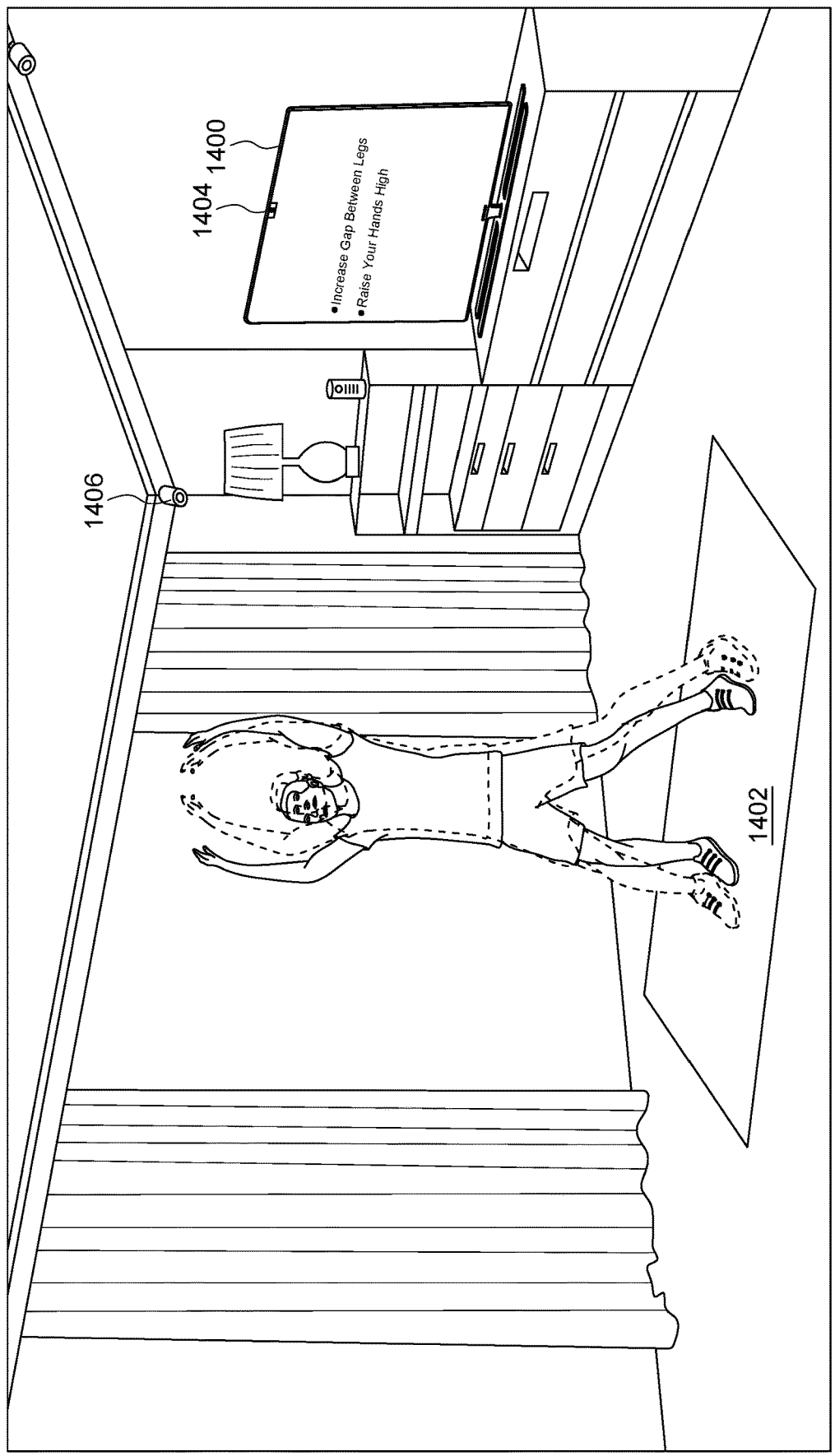
FIG. 14 represents a pictorial depiction of a scenario for rendering a combined feedback for one or more events, in accordance with some exemplary embodiment.

Referring now to FIG. 14, a pictorial depiction of a scenario for rendering a combined feedback for one or more events is represented, in accordance with some exemplary embodiment. As represented in the present FIG. 14, a user 1402 may be performing a jumping jack exercise. In the present FIG. 14, solid line depicts current posture of the user 1402, i.e., a position in which the user 1402 may be performing the jumping jack exercise. Whereas a dotted line may represent correct posture of the user 1402, i.e., a position in which the user 1402 must perform the jumping jack exercise. While performing the jumping jack exercise, occurrence of two events, for example, 'legs closer' and 'hands not straight' might have identified. It should be noted that, each of the two events may be identified via a camera 1404 of a display device 1400. In reference to FIG. 2A-2F, the camera 1404 may correspond to the camera 204. Upon identifying each of the two events, each of the two events may be processed to assign the priority as described via the step 406 to step 412 in the FIG. 4. Since each of the two events are major events, therefore similar priority may be assigned to each of the two events. For example, for each of the two events, i.e., 'legs closer' and 'hands not straight', priority '1' may be assigned.

Further, based on the assigned priority, i.e., '1', to each of the two events, a summary may be generated. Once the summary is generated, a consolidated feedback may be produced and rendered to the user 1402. The combined feedback associated with each of the two events, i.e., 'legs closer' and 'hands not straight' rendered to the user may correspond to 'increase gap between legs' and 'raise your hands high' as depicted via a display screen of the display device 1400. In reference to FIG. 2, the display device 1400 may correspond to the smart device 200. In some embodiment, the combined feedback may be the audio-based feedback. The audio-based feedback may be provided to the user 1402 via an inbuilt speaker of the display device 1400 or speakers 1406 configured with the display device 1400. It should be noted that, the feedback rendered to the user 1402 may be in the target language determined for the user 1402.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will be appreciated by those skilled in the art, the techniques described in the various embodiments discussed above are not routine, or conventional, or well understood in the art. The techniques discussed above may determine a target language associated with a user, based on at least one of a user-profile, a location of the user, or an input language provided by the user. The technique may identify occurrence of at least one event requiring rendering of automated feedback to the user. Each of the at least one event may be associated with a feedback. The technique may determine ambient factors at and proximate to the time of occurrence of each of the at least one event, and user attributes. The technique may determine a criticality factor associated with each of the at least one event based on the ambient factors and the user attributes. The technique may determine, for each of the at least one event, a feedback rendering time window in response to identifying occurrence of each of the at least one event, based on the associated criticality factor and the user attributes. The technique may identify, for each of the at least one event, feedback attributes of the associated feedback, based on the determined feedback rendering time window, the user attributes, and the target language. The technique may assign a priority to each of the at least one event based on the associated feedback rendering time window and the feedback attributes. The technique may identify one or more events from each of the at least one event based on the assigned priority. The priority determined for each of the one or more events may be greater than a threshold. Contemporaneous to identifying occurrence of the one or more events, the technique may render the feedback associated with each of the one or more events to the user.

Thus, the disclosed method and system provide some advantages, like, the disclosed method and system may be able to timely deliver AI feedbacks to the user. In addition to timely and appropriate delivery of the AI feedbacks that does not have any backlogs, the disclosed method and system may provide the AI feedback in user specific language (i.e., the target language). Further, the disclosed method and system may be able to quickly respond to user activities, upon identifying occurrence of any event associated with the user activities in the user specific language, thereby enhancing user experience.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of providing language based adaptive feedback to users, the method comprising:
   receiving, by an AI Model, information related to a target language associated with a user, wherein the target language is determined based on at least one of a user-profile, a location of the user, interactions with the user, or an input language provided by the user;
   identifying, by the AI Model, an occurrence of at least one event requiring rendering of automated feedback to the user, wherein each of the at least one event is associated with a feedback;
   determining, by the AI Model, ambient factors at and proximate to a time of the occurrence of each of the at least one event, and user attributes;
   determining, by the AI Model, a criticality factor associated with each of the at least one event based on the ambient factors and the user attributes, wherein the criticality factor is determined iteratively and varies dynamically based on real-time sensor data and context;
   determining, by the AI Model, for each of the at least one event, a feedback rendering time window in response to identifying the occurrence of each of the at least one event, based on the associated criticality factor and the user attributes, wherein the feedback rendering time window is dynamically computed based on at least one of: urgency, severity of the at least one event, or changes corresponding to the ambient factors and user conditions;
   identifying, by the AI Model, for each of the at least one event, feedback attributes of the associated feedback, based on the determined feedback rendering time window, the user attributes, and the target language;
   assigning, by the AI Model, a priority to each of the at least one event based on the associated feedback rendering time window and the feedback attributes;

identifying, by the AI Model, one or more events from each of the at least one event based on the assigned priority, wherein the priority determined for each of the one or more events is greater than a threshold, wherein the threshold varies based on the ambient factors and contextual relevance as determined by the AI model; and contemporaneous to identifying occurrence of the one or more events, rendering, by the AI Model, a feedback associated with each of the one or more events to the user;

wherein rendering the feedback associated with each of the one or more events comprises determining non-overlapping and non-interfering modes of rendering the feedback associated with each of the one or more events.

2. The method of claim 1, wherein rendering the feedback associated with each of the one or more events comprises:
determining a priority order associated with the one or more events; and
rendering the feedback associated with each of the one or more events based on the determined priority order.

3. The method of claim 2, wherein determining the priority order associated with the one or more events comprises:
determining relevancy of each of the one or more events at a current time based on preceding proximate events; and
determining the priority order for the one or more events at the current time, based on the relevancy determined for each of the one or more events.

4. The method of claim 2, wherein determining the priority order associated with the one or more events comprises:
detecting, at the current time, a requirement for rendering the feedback for at least one of the one or more events; and
determining, at the current time, the priority order for the at least one of the one or more events based on the detected requirement.

5. The method of claim 1, wherein assigning the priority to each of the at least one event comprises:
determining a number of occurrences of each of the at least one event; and
increasing the priority of one or more events from each of the at least one event, upon determining the number of occurrences of the one or more event to be beyond an occurrence threshold.

6. The method of claim 1, wherein assigning the priority to each of the at least one event comprises:
detecting a reoccurrence of one or more events from each of the at least one event based on the rendered feedback; and
changing the priority of each of the one or more events based on the detected reoccurrence, wherein the priority of each of the one or more events is changed to avoid reiteration of rendering of the feedback for the one or more events.

7. The method of claim 1, further comprising:
consolidating the one or more events from the at least one event based on the assigned priority, wherein the priority assigned to each of the one or more events is similar or related;
generating a summary of each of the one or more events based on the consolidation; and
rendering, to the user, a combined feedback for each of the one or more events based on the generated summary.

8. A system for providing language based adaptive feedback to users, the system comprising:
a processor; and
a memory communicatively coupled to the processor, wherein the memory stores processor-executable instructions, which, on execution, causes the processor to:
receive information related to a target language associated with a user, wherein the target language is determined based on at least one of a user-profile, a location of the user, interactions with the user, or an input language provided by the user;
identify an occurrence of at least one event requiring rendering of automated feedback to the user, wherein each of the at least one event is associated with a feedback;
determine ambient factors at and proximate to a time of the occurrence of each of the at least one event, and user attributes;
determine a criticality factor associated with each of the at least one event based on the ambient factors and the user attributes, wherein the criticality factor is determined iteratively and varies dynamically based on real-time sensor data and context;
determine, for each of the at least one event, a feedback rendering time window in response to identifying the occurrence of each of the at least one event, based on the associated criticality factor and the user attributes; wherein the feedback rendering time window is dynamically computed based on at least one of: urgency, severity of the at least one event, or changes corresponding to the ambient factors and user conditions;
identify, for each of the at least one event, feedback attributes of the associated feedback, based on the determined feedback rendering time window, the user attributes, and the target language;
assign a priority to each of the at least one event based on the associated feedback rendering time window and the feedback attributes;
identify one or more events from each of the at least one event based on the assigned priority, wherein the priority determined for each of the one or more events is greater than a threshold, wherein the threshold varies based on the ambient factors and contextual relevance as determined by an AI model; and
contemporaneous to identifying occurrence of the one or more events, render a feedback associated with each of the one or more events to the user;

wherein rendering the feedback associated with each of the one or more events comprises determining non-overlapping and non-interfering modes of rendering the feedback associated with each of the one or more events.

9. The system of claim 8, wherein, to render the feedback associated with each of the one or more events, the processor-executable instructions further cause the processor to:
determine a priority order associated with the one or more events; and
render the feedback associated with each of the one or more events based on the determined priority order.

10. The system of claim 9, wherein, to determine the priority order associated with the one or more events, the processor-executable instructions further cause the processor to:

determine relevancy of each of the one or more events at a current time based on preceding proximate events; and determine the priority order for the one or more events at the current time, based on the relevancy determined for each of the one or more events.

11. The system of claim 9, wherein, to determine the priority order associated with the one or more events, the processor-executable instructions further cause the processor to:

detect, at the current time, a requirement for rendering the feedback for at least one of the one or more events; and determine, at the current time, the priority order for the at least one of the one or more events based on the detected requirement.

12. The system of claim 8, wherein, to assign the priority to each of the at least one event, the processor-executable instructions further cause the processor to:

determine a number of occurrences of each of the at least one event; and increase the priority of one or more events from each of the at least one event, upon determining the number of occurrences of the one or more event to be beyond an occurrence threshold.

13. The system of claim 8, wherein, to assign the priority to each of the at least one event, the processor-executable instructions further cause the processor to:

detect a reoccurrence of one or more events from each of the at least one event based on the rendered feedback; and change the priority of each of the one or more events based on the detected reoccurrence, wherein the priority of each of the one or more events is changed to avoid reiteration of rendering of the feedback for the one or more events.

14. The system of claim 8, wherein the processor-executable instructions further cause the processor to:

consolidate the one or more events form the at least one event based on the assigned priority, wherein the priority assigned to each of the one or more events is similar or related;

generate a summary of each of the one or more events based on the consolidation; and render, to the user, a combined feedback for each of the one or more events based on the generated summary.

15. A non-transitory computer-readable medium storing computer-executable instructions for providing language based adaptive feedback to users, the computer-executable instructions configured for:

receiving, by an AI Model, information related to a target language associated with a user, wherein the target language is determined based on at least one of a user-profile, a location of the user, interactions with the user, or an input language provided by the user;

identifying, by the AI Model, an occurrence of at least one event requiring rendering of automated feedback to the user, wherein each of the at least one event is associated with a feedback;

determining, by the AI Model, ambient factors at and proximate to a time of the occurrence of each of the at least one event, and user attributes;

determining, by the AI Model, a criticality factor associated with each of the at least one event based on the ambient factors and the user attributes, wherein the criticality factor is determined iteratively and varies dynamically based on real-time sensor data and context;

determining, by the AI Model, for each of the at least one event, a feedback rendering time window in response to identifying the occurrence of each of the at least one event, based on the associated criticality factor and the user attributes wherein the feedback rendering time window is dynamically computed based on at least one of: urgency, severity of the at least one event, or changes corresponding to the ambient factors and user conditions;

identifying, by the AI Model, for each of the at least one event, feedback attributes of the associated feedback, based on the determined feedback rendering time window, the user attributes, and the target language;

assigning, by the AI Model, a priority to each of the at least one event based on the associated feedback rendering time window and the feedback attributes;

identifying, by the AI Model, one or more events from each of the at least one event based on the assigned priority, wherein the priority determined for each of the one or more events is greater than a threshold, wherein the threshold varies based on the ambient factors and contextual relevance as determined by the AI model; and contemporaneous to identifying occurrence of the one or more events, rendering, by the AI Model, a feedback associated with each of the one or more events to the user;

wherein rendering the feedback associated with each of the one or more events comprises determining non-overlapping and non-interfering modes of rendering the feedback associated with each of the one or more events.

* * * * *